(12) United States Patent
Zilberman et al.

(10) Patent No.: US 11,845,447 B2
(45) Date of Patent: Dec. 19, 2023

(54) METHOD, APPARATUS, AND SYSTEM FOR DETECTING AN ON-BOARDING OR OFF-BOARDING EVENT BASED ON MOBILE DEVICE SENSOR DATA

(71) Applicant: HERE Global B.V., Eindhoven (NL)

(72) Inventors: Silviu Zilberman, Rishon Le-Zion (IL); Harel Primack, Rishon Le-Zion (IL); Ofri Rom, Ganey Tikva (IL)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/562,702

(22) Filed: Dec. 27, 2021

(65) Prior Publication Data

US 2023/0202488 A1 Jun. 29, 2023

(51) Int. Cl.
*B60W 40/112* (2012.01)
*B60W 40/08* (2012.01)
*G01C 9/06* (2006.01)

(52) U.S. Cl.
CPC .......... *B60W 40/112* (2013.01); *B60W 40/08* (2013.01); *G01C 9/06* (2013.01); *B60W 2540/221* (2020.02)

(58) Field of Classification Search
CPC ............... B60W 40/112; B60W 40/08; B60W 2540/221; G01C 9/06
See application file for complete search history.

(56) References Cited

U.S. PATENT DOCUMENTS

| | | | |
|---|---|---|---|
| 9,628,958 B1 * | 4/2017 | McBurney | H04W 4/027 |
| 11,560,082 B2 * | 1/2023 | Kang | B60Q 1/115 |
| 2008/0012696 A1 * | 1/2008 | Segura Gordillo | G07C 9/00174 340/435 |
| 2014/0180730 A1 | 6/2014 | Cordova et al. | |
| 2014/0180731 A1 * | 6/2014 | Cordova | G06Q 40/08 705/4 |

(Continued)

FOREIGN PATENT DOCUMENTS

CN 113060095 A 7/2021

OTHER PUBLICATIONS

Wikipedia, "Car Suspension", retrieved on Dec. 27, 2021 from https://www.wikiwand.com/en/Car_suspension, 25 pages.

(Continued)

*Primary Examiner* — Yazan A Soofi
*Assistant Examiner* — Naeem Taslim Alam
(74) *Attorney, Agent, or Firm* — DITTHAVONG, STEINER & MLOTKOWSKI

(57) ABSTRACT

An approach is provided for detecting an on-boarding or off-boarding event based on mobile device sensor data. The approach, for example, involves retrieving sensor data collected from at least one sensor of a mobile device that is fixed in a stationary position relative to a vehicle. The approach also involves processing the sensor data to determine roll angle data for the vehicle over a time window. The approach further involves processing the roll angle data to determine one or more transitions of a roll angle value of the vehicle between one or more value levels. The approach further involves determining an on-boarding event, an off-boarding event, or a combination thereof based on the one or more transitions. The approach further involves providing the on-boarding event, the off-boarding event, or a combination thereof as an output.

20 Claims, 16 Drawing Sheets

(56) References Cited

U.S. PATENT DOCUMENTS

| | | | | |
|---|---|---|---|---|
| 2015/0329121 | A1* | 11/2015 | Lim | H04M 1/72412 |
| | | | | 701/36 |
| 2015/0369836 | A1* | 12/2015 | Cordova | G01P 15/18 |
| | | | | 702/141 |
| 2016/0036964 | A1* | 2/2016 | Barfield, Jr. | H04W 4/029 |
| | | | | 455/418 |
| 2018/0039917 | A1* | 2/2018 | Buttolo | B60W 60/00253 |
| 2018/0293523 | A1* | 10/2018 | Bergdale | G06Q 20/405 |
| 2019/0193986 | A1 | 6/2019 | Studer et al. | |
| 2019/0217831 | A1* | 7/2019 | Viele | G07C 5/0816 |
| 2019/0316915 | A1* | 10/2019 | Koda | G08G 1/0968 |
| 2019/0340911 | A1 | 11/2019 | Jungvid et al. | |
| 2020/0247359 | A1* | 8/2020 | Murray | B60R 25/305 |
| 2020/0272951 | A1 | 8/2020 | Yoshida et al. | |
| 2021/0004929 | A1* | 1/2021 | Sawahashi | G08G 1/202 |
| 2022/0144160 | A1* | 5/2022 | Kang | B60Q 1/115 |
| 2022/0161889 | A1* | 5/2022 | Wahl | B60T 8/1706 |
| 2022/0167545 | A1* | 6/2022 | Ishikawa | A01B 79/005 |
| 2022/0351621 | A1* | 11/2022 | Hüger | G08G 1/14 |
| 2023/0010175 | A1* | 1/2023 | Kato | B60W 40/112 |

OTHER PUBLICATIONS

Wikipedia, "Rotation formalisms in three dimensions", retrieved on Dec. 27, 2021 from https://www.wikiwand.com/en/Rotation_formalisms_in_three_dimensions#/Rotation_matrix_%E2%86%94_Euler_axis/angle, 26 pages.

Fisher et al., "Rotate", HIPR2, retrieved on Dec. 27, 2021 https://homepages.inf.ed.ac.uk/rbf/HIPR2/rotate.htm, 5 pages.

Wikipedia, "Log-polar coordinates", retrieved on Dec. 27, 2021 from https://en.wikipedia.org/wiki/Log-polar_coordinates, 5 pages.

Rocca, "Ensemble methods: bagging, boosting and stacking", Apr. 22, 2019, retrieved from https://towardsdatascience.com/ensemble-methods-bagging-boosting-and-stacking-c9214a10a205, 22 pages.

* cited by examiner

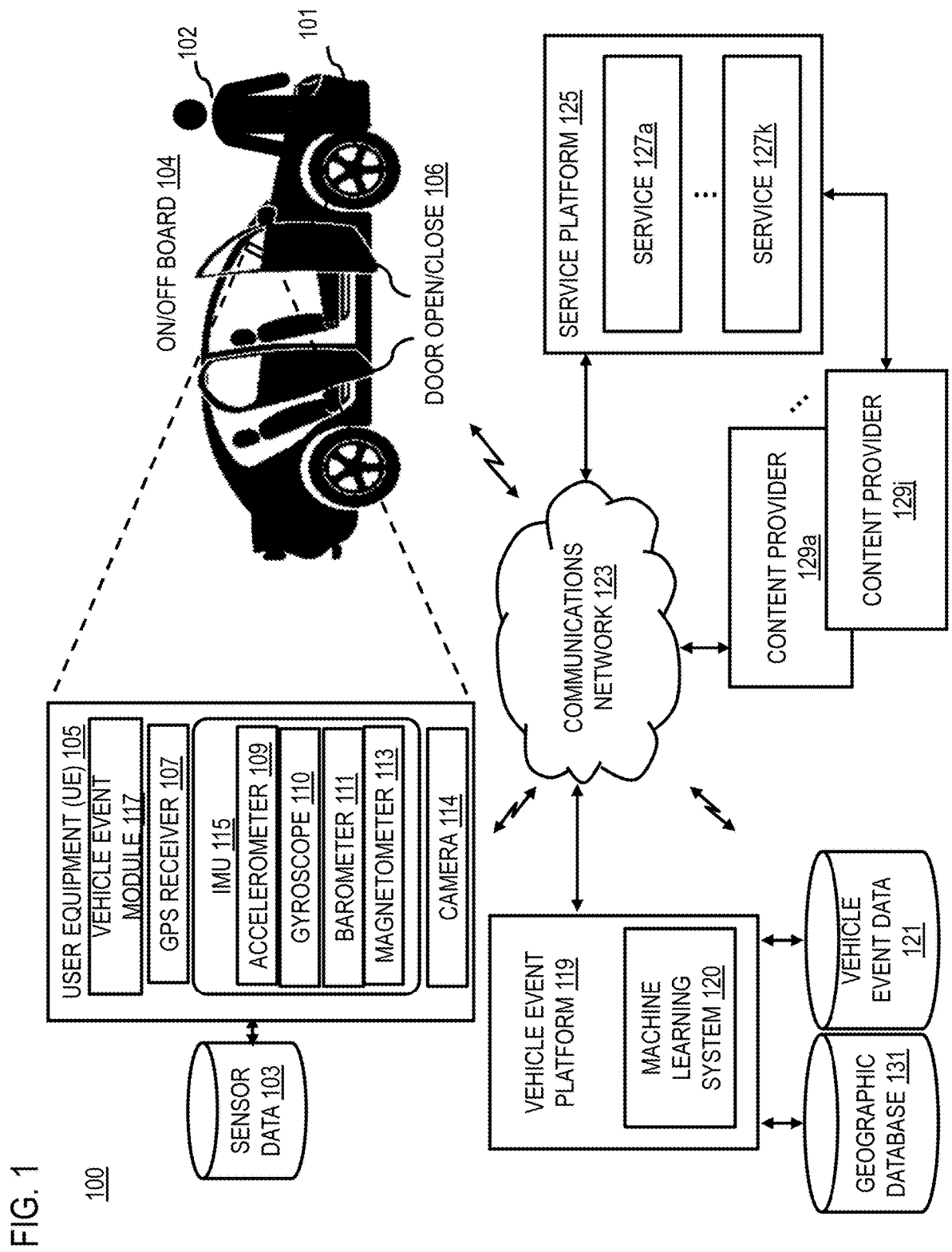

230

300

310

400

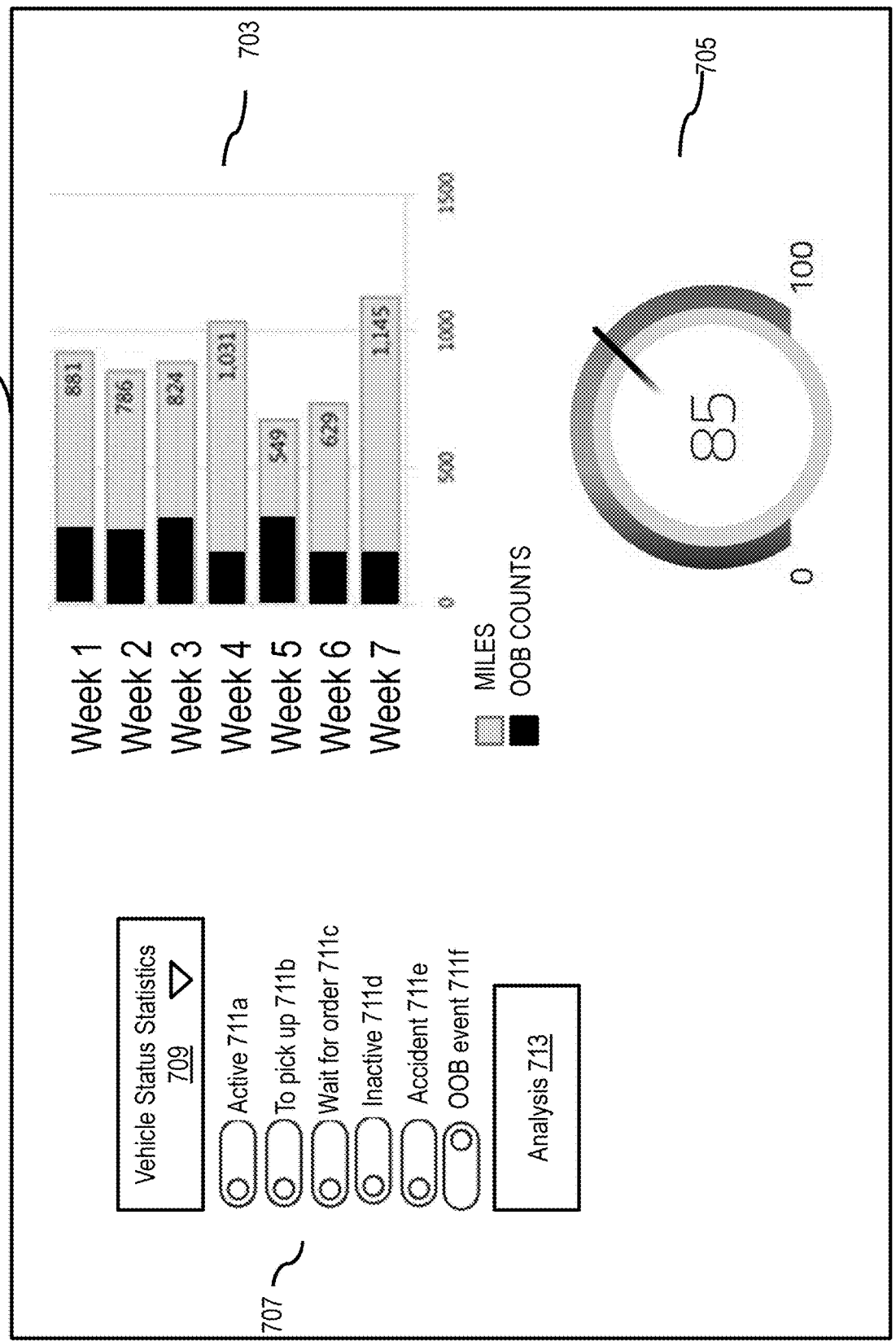

METHOD, APPARATUS, AND SYSTEM FOR DETECTING AN ON-BOARDING OR OFF-BOARDING EVENT BASED ON MOBILE DEVICE SENSOR DATA

BACKGROUND

Many navigation, ride-hailing, ride-sharing and/or other location-based services rely on driver entries to determine on-boarding or off-boarding events and calculate fees accordingly. However, some drivers cheat on the services by not reporting or under-reporting rides. For instance, a driver accepted a trip request by a passenger, drove to the passenger's pickup location, and entered the trip request as cancelled while still drove to the destination of the passenger. Modern vehicles can be equipped with multiple sensors that can easily detect the on-boarding or off-boarding events, such as pressure (weight) sensors in the seats and detection of buckle/unbuckle events. However, those sensors are not accessible for service providers, which usually rely on mobile phones or other particular devices, such as special tablets, for reporting driver's status to the service provider. To determine an on-boarding or off-boarding event, the service providers can detect different angle changes based on analyzing the body motions (e.g., driving vs. walking) of a rider during on-boarding and off-boarding events. However, the user may turn off the application after on-boarding, leave the mobile device in the vehicle, or move the mobile device in sharp movements such as during gaming or call, which destroy such body motion approach. As a result, service providers face significant challenges to better detect on-boarding/off-boarding events based on mobile device sensor data.

SOME EXAMPLE EMBODIMENTS

Therefore, there is a need for an approach for accurately detecting an on-boarding or off-boarding event based on mobile device sensor data, typically of a driver, such as analyzing the vehicle motion(s) caused by such on-boarding or off-boarding event.

According to one embodiment, a method comprises retrieving sensor data collected from at least one sensor of a mobile device that is fixed in a stationary position relative to a vehicle. The method also comprises processing the sensor data to determine roll angle data for the vehicle over a time window. The method further comprises processing the roll angle data to determine one or more transitions of a roll angle value of the vehicle between one or more value levels. The method further comprises determining an on-boarding event, an off-boarding event, or a combination thereof based on the one or more transitions. The method further comprises providing the on-boarding event, the off-boarding event, or a combination thereof as an output.

According to another embodiment, an apparatus comprises at least one processor, and at least one memory including computer program code for one or more computer programs, the at least one memory and the computer program code configured to, with the at least one processor, cause, at least in part, the apparatus to retrieve sensor data collected from at least one sensor of a mobile device that is fixed in a stationary position relative to a vehicle. The apparatus is also caused to process the sensor data to determine roll angle data for the vehicle over a time window. The apparatus is further caused to process the roll angle data to determine one or more transitions of a roll angle value of the vehicle between one or more value levels. The apparatus is further caused to determine an on-boarding event, an off-boarding event, or a combination thereof based on the one or more transitions. The apparatus is further caused to provide the on-boarding event, the off-boarding event, or a combination thereof as an output.

According to another embodiment, a computer-readable storage medium carries one or more sequences of one or more instructions which, when executed by one or more processors, cause, at least in part, an apparatus to retrieve sensor data collected from at least one sensor of a mobile device that is fixed in a stationary position relative to a vehicle. The apparatus is also caused to process the sensor data to determine roll angle data for the vehicle over a time window. The apparatus is further caused to process the roll angle data to determine one or more transitions of a roll angle value of the vehicle between one or more value levels. The apparatus is further caused to determine an on-boarding event, an off-boarding event, or a combination thereof based on the one or more transitions. The apparatus is further caused to provide the on-boarding event, the off-boarding event, or a combination thereof as an output.

According to another embodiment, a computer program product may be provided. For example, a computer program product comprising instructions which, when the program is executed by a computer, cause the computer to retrieve sensor data collected from at least one sensor of a mobile device that is fixed in a stationary position relative to a vehicle. The computer is also caused to process the sensor data to determine roll angle data for the vehicle over a time window. The computer is further caused to process the roll angle data to determine one or more transitions of a roll angle value of the vehicle between one or more value levels. The computer is further caused to determine an on-boarding event, an off-boarding event, or a combination thereof based on the one or more transitions. The computer is further caused to provide the on-boarding event, the off-boarding event, or a combination thereof as an output.

According to another embodiment, an apparatus comprises means for retrieving sensor data collected from at least one sensor of a mobile device that is fixed in a stationary position relative to a vehicle. The apparatus also comprises means for processing the sensor data to determine roll angle data for the vehicle over a time window. The apparatus further comprises means for processing the roll angle data to determine one or more transitions of a roll angle value of the vehicle between one or more value levels. The apparatus further comprises means for determining an on-boarding event, an off-boarding event, or a combination thereof based on the one or more transitions. The apparatus further comprises means for providing the on-boarding event, the off-boarding event, or a combination thereof as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive. In particular, "speed" and "velocity" are used and can be used interchangeably along this manuscript.

BRIEF DESCRIPTION OF THE DRAWINGS

The embodiments of the invention are illustrated by way of example, and not by way of limitation, in the figures of the accompanying drawings:

FIG. 1 is a diagram of a system capable of detecting an on-boarding or off-boarding event based on mobile device sensor data, according to one embodiment;

FIG. 7A is a diagram of a user interface associated with on-boarding/off-boarding events, according to one embodiment;

DESCRIPTION OF SOME EMBODIMENTS

Examples of a method, apparatus, and computer program for determining an on-boarding or off-boarding event based on mobile device sensor data (e.g., collected from an accelerometer, gyroscope, magnetometer, camera, barometer, microphone, etc. of mobile device(s)) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent or similar arrangement. In other instances, well-known structures and devices are shown in block diagram form in order to avoid unnecessarily obscuring the embodiments of the invention.

FIG. 1 is a diagram of a system capable of detecting an on-boarding or off-boarding event based on mobile device sensor data (e.g., roll angle data), according to one embodiment. The challenge is to automatically and correctly identify events of on/off boarding a vehicle (OOB), regardless of whether the user is carrying a mobile device or using it during the relevant time interval. Such OOB identification can be used, e.g., by a dispatcher for which the driver is a subcontractor or employee thereof to verify passenger on-boarding or off-boarding for sake of billing, fraud detection/prevention, etc.

To address the technical challenges related to determining an OOB event and minimize false OOB detection, the system 100 of FIG. 1 introduces a capability to detect an on-boarding or off-boarding event 104 of a user 102 based on sensor data 103 captured by a user equipment (UE) 105 (i.e., the driver's smartphone) that is at a fixed (in an arbitrary) position in the vehicle, such as mounted on the dashboard. The system 100 can real-time identify semantic events, such a door open (by a rider, e.g., a driver, passenger, etc.), rider left car, rider entered car, the door close, etc., for example, by measuring mechanical processes associated with OOB, yielding results within a few seconds.

Figure 2A:
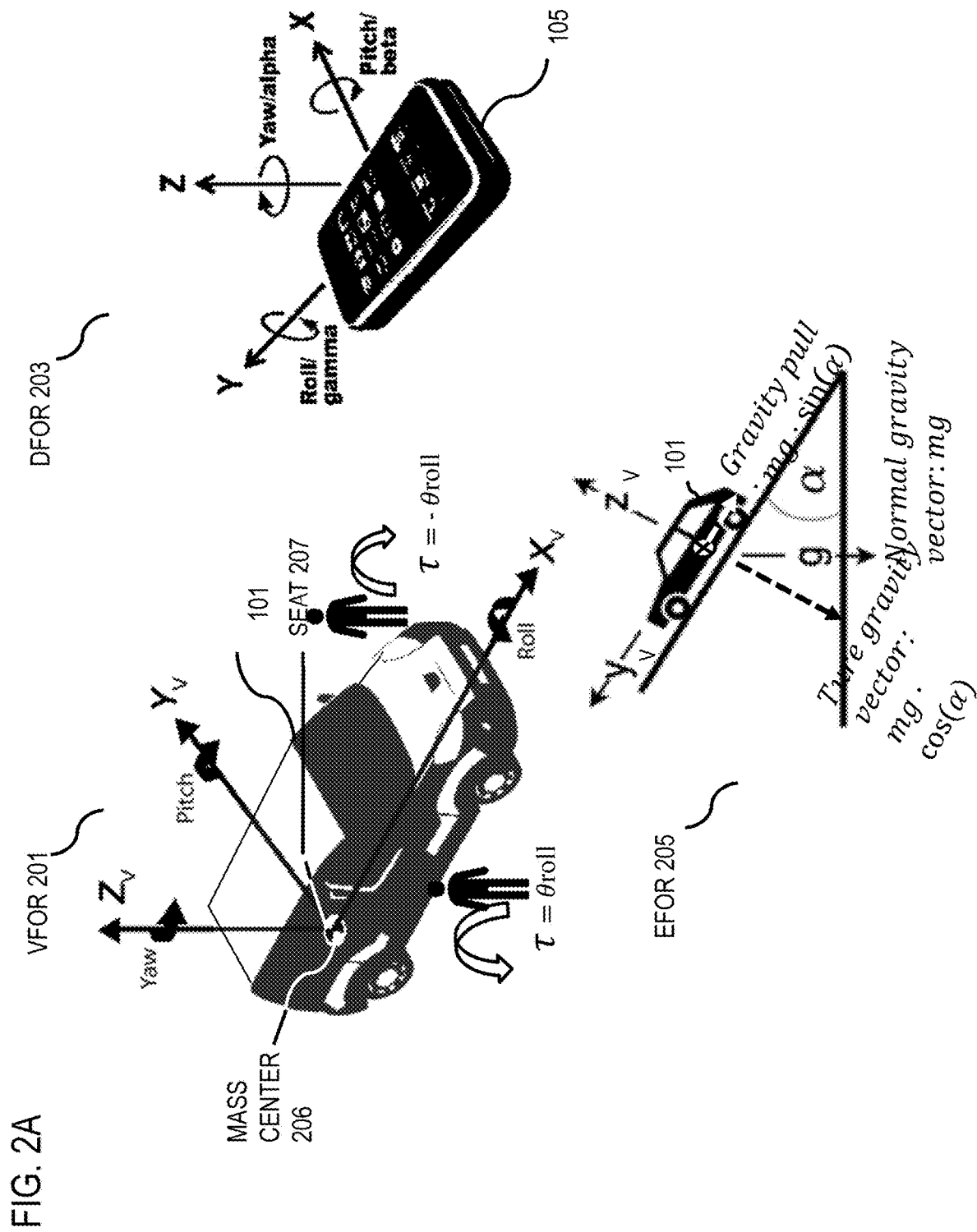
FIG. 2A depict example frames of reference for determining vehicle events, according to one embodiment.

FIG. 2A depicts example frames of reference for determining vehicle events, according to one embodiment. Pitch, yaw and roll are the three dimensions of angular movement when the vehicle 101 moves. When the user 102 enters the vehicle 101, the action generates a torque τ around the vehicle's x-axis (Xv in FIG. 2A) in a vehicle frame of reference (VFOR) 201. The torque τ is shown as equation (1):

$$\tau = r \times (mg) \quad (1)$$

The torque τ can depend on the vehicle dimensions, where r is the distance in the y-z plane between a center of mass/gravity 206 of the vehicle 101 and a seat 207, while m≈50-100 Kg (e.g., a mass range of typical passengers). Based on an elastic proportion in Equation (2):

$$\theta_{roll} \sim \tau \quad (2)$$

In FIG. 2A, the VFOR 201 has axes Xv, Yv, and Zv, while a device frame of reference (DFOR) 203 has axes X, Y, and Z, and an earth frame of reference (EFOR) 205 with a local gradient or inclination angle α. The system 100 can assume the UE 105 as stationary with respect to the vehicle 101, then calculate the torque τ and/or its approximation sensor data 103 based on DFOR 203. The torque yields a change in the vehicle's roll angle: positive $\tau \sim \theta_{roll}$ if the user enters on the passenger side, or negative $\tau \sim -\theta_{roll}$ if the user enters on the driver side (assuming the driver is on the left side). The angular response $\theta_{roll}$ depends on the combined response of the suspension system, such as tires type, air pressure, shock absorbers springs and linkage, etc. The change in the roll angle, though minute, is clearly observed using various sensors, including its sign (direction).

There are phenomena that change during an OOB event, like forces acting in the direction of the gravity vector in VFOR which reflect a change of the torque τ. For instance, during an on-boarding event, there is a transient increase in (linear) acceleration measured along the gravity vector (e.g., the up direction as measured by the accelerometer) due to the momentum impact of the user sitting on the car, which is an observable short time effect. Similarly, during an off-boarding event, there is an opposite (and smaller) effect associated with the reduced torque that yields a motion in the direction opposite to the gravity direction. There can be three logical stages of an OOB detecting process: (1) detection of potential OOB signals based on semantic events (such as associated with a vehicle traveling within a road network, a transportation system, a parking facility, vehicle door close/open events, etc.) and analysis of the raw sensor signals; (2) identification/classification of the signals as OOB when applicable based on sensor information; and (3) characterization of the OOB event, e.g., on-boarding vs. off-boarding, right or left side of the vehicle, user weight estimation, etc. The system 100 can apply multiple sensors/technologies (e.g., accelerometer, gyroscope, magnetometer, camera, etc.) independently and concurrently during the three logical stages.

Figure 2B:
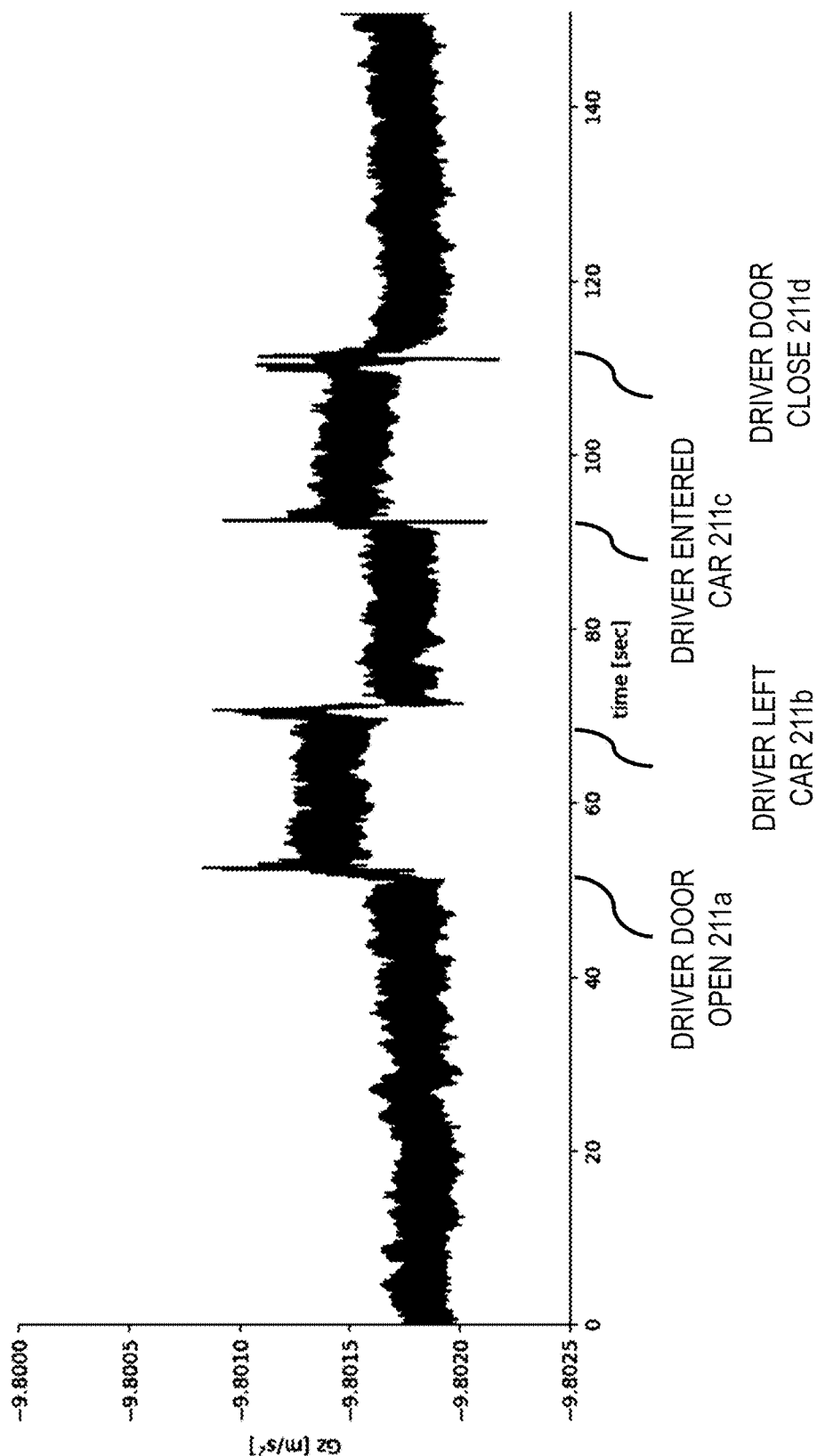
FIG. 2B illustrating an example gravity vector profile of a vehicle, according to one embodiment.
Figure 2C:
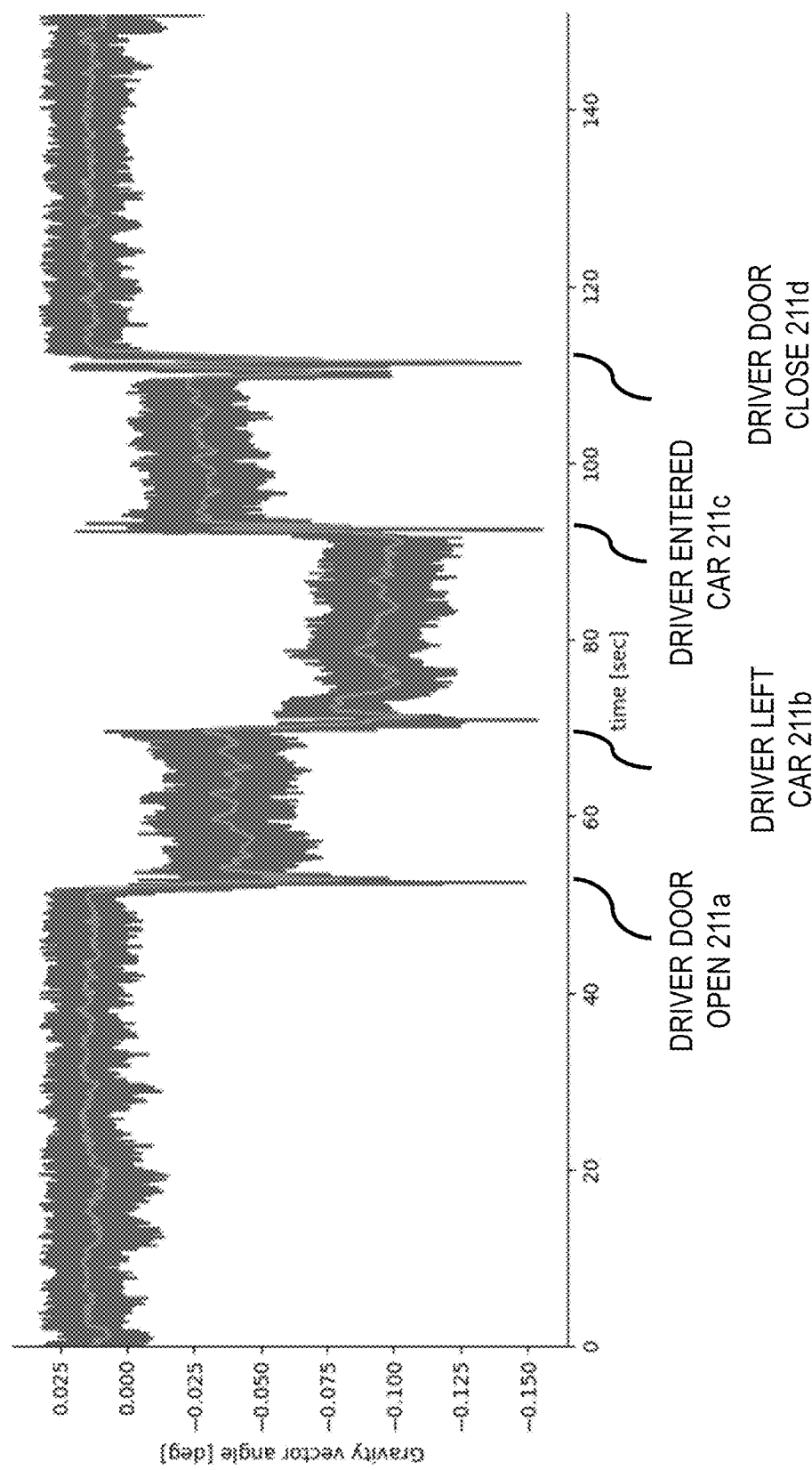
FIG. 2C illustrating an example gravity vector angle profile of a vehicle, according to one embodiment.

In one embodiment, the system 100 can process accelerometer data based on a polarity of response and tilting of the gravity vector to deduct a roll angle change (e.g., FIGS. 2B-2C). In another embodiment, the system 100 can deduct the roll angle and an angular change in the direction of a gravity vector of the vehicle 101, from integration over gyroscope data (e.g., FIG. 2D). In another embodiment, the system 100 can use a phone camera as a video recorder to observe the change in an image rotation angle over the OOB event (e.g., FIGS. 3A-3B). In yet another embodiment, the system 100 can determine a rotation angle change based on image tilting (FIG. 4). In yet another embodiment, the system 100 can determine an angle change of the effective north based on magnetometer data. Some of the technologies may require the UE 105 to be in an arbitrary stationary position in the vehicle 101, before and after OOB, while an event time window/length is somewhat method dependent. Each kind of sensor data can contribute to the detection/identification/characterization stages. While some kinds of the sensor data 103 can stand alone to detect an on-boarding or off-boarding event, the system 100 can integrate them into one detection algorithm, using, e.g., rule-based, or machine leaning, deep learning, artificial intelligence, etc. techniques.

In one embodiment, these sensor data processing technologies can be applied in real-time and continuously to collect sensor data 103 at times which are irrelevant for OOB, such as during standard drive, stopping at traffic lights and signs, or the like. As such, filtering for time slots in which OOB events are plausible is essential to ensure low rates of false positive and/or false negative detections.

For instance, to detect potential OOB signals based on semantic events in the (1) stage, the system 100 can utilize a sequence of OOB sematic events listed in Table 1 to determine possible timing of a potential OOB. While in motion, OOB events are practically impossible (excluding the very unlikely events of passengers jumping out of a moving car). Therefore, a potential OOB is likely to occur during a vehicle idle state (e.g., car idle, engine off/car idle, or engine on/car idle). All those semantic events are clear and easy to capture (such as associated with a vehicle traveling within a road network, a transportation system, a parking facility, etc.), and the time window between the door open and door close events 106 (hereinafter "the event time window (ETW)") is the most likely time for the OOB events 104.

TABLE 1

OOB events sequence: vehicle in motion -> vehicle stopping (car idle) -> vehicle door open -> (OOB?) -> vehicle door close -> vehicle in motion Accelerometer Based Detection, Identification and Characterization The system 100 can assume that the UE 105 is in a stationary position during the OOB events sequence for about 10-30 s during the initial and final 'car in motion' stages of the events sequence, in order to properly sample the transition from idle to in-motion states. The system 100 can assume that though stationary, the orientation of the UE 105 is arbitrary within the vehicle 101.

To detect potential OOB signals based on semantic events during the (1) stage, the system 100 can record, at the beginning of the ETW, a rotation operator R (as provided by the operation system of the UE 105). The rotation operator R can be used for converting any vector quantity between the device frame of reference (DFOR) 203 and the vehicle frame of reference (VFOR) 201 via an earth frame of reference (EFOR) 205 as in the following equation (3). All IMU measurements within the ETW are rotated to EFOR using $R_0$ and then rotated to VFOR using $R_1$. For instance, the local gradient α can be calculated along a trajectory line. When setting a positive y-axis direction as along a road tangential unit vector, the negative z-axis direction is g·cos(α) relative to EFOR, and α is the inclination angle. The transverse x-axis can be the cross product of the y and z axes. The system 100 can calculate a rotation matrix R1(EFOR→VFOR), e.g., from a north-east-up earth frame of reference to the vehicle frame of reference. The system

100 can then calculate a full rotation matrix R is given by the equation (3). This results in determining the angular position of the vehicle 101 at any given time with respect to the EFOR independently of the (fixed) position (with respect to the vehicle 101) of the UE 105.

$$R(DFOR \rightarrow VFOR) = R0(DFOR \rightarrow EFOR) \cdot R1(EFOR \rightarrow VFOR) \quad (3)$$

In one embodiment, the system 100 can detect potential OOB signals by looking at sharp level changes of the rotated gravity vector as illustrated in FIG. 2B. FIG. 2B illustrating an example gravity vector profile 210 of a vehicle $G_z$ (m/s²) during an ETW, according to one embodiment. FIG. 2B depicts $G_z$ (m/s²) ranging from −9.8025 to −9.8000 during an ETW of 0-150 seconds, and the profile has clear transitions associated with door open/close (OCD) events 211a, 211d and on-boarding and off-boarding events 211b, 211c. For instance, measurements carried out using the UE 105 on the vehicle 101 depict in FIG. 2B that the driver door opens at ~52 s, the driver left the car at ~70 s, the driver entered the car at ~90 s, and the driver door closed at ~110 s. The door open/close events can be distinguished from the OOB events using FIGS. 2B-2C. Alternatively or concurrently, the system 100 can apply low-pass filtering to detect/improve level change(s).

In another embodiment, the system 100 can detect potential OOB signals by following the angle change of the gravity vector, relative to the ETW start: $\tan \alpha(t) = \|v \times v0\|/(v \cdot v0)$, as illustrated in FIG. 2C. Gravity vector angle changes are clearly observed in FIG. 2C during the OCD events 211a, 211d, as well as the OOB events 211b, 211c. FIG. 2C illustrating an example gravity vector angle profile 220 (in degree from −0.175 to 0) of a vehicle, according to one embodiment. FIG. 2C traces time of an angle between the gravity vectors relative to the vector at t=0 to t=150. FIG. 2C also depicts that the driver door opens at ~52 s, the driver left the car at ~70 s, the driver entered the car at ~90 s, and the driver door close at ~110 s. The dark gray band in FIG. 3C depicts the raw data while the light gray line therein depicts filtered data (e.g., using a lowpass finite impulse response (FIR) filter).

In addition, when a mean relative angle at the end of the ETW differs from the one at the beginning of the ETW in FIG. 2C, it clearly indicates that there was an OOB event occurred in-between. Using previously accumulated data and knowledge, the system 100 can distinguish between on-boarding and off-boarding events, and determine the total number of passengers (including driver) in the vehicle 101.

To classify the OOB events during the (2) stage, the system 100 can distinguish the OCD events from the OOB events using FIGS. 2B-2C. Although FIG. 2B shows that the responses of the OCD events are similar in magnitude to the OOB events, the OOB events are shaped differently from the OCD event. For instance, the driver door open event 211a and the driver left car event 211b are shaped differently. The driver door open event 211a has a gravity vector increasing from −0.8007 to −9.8020 then dropping to −9.8015, while the driver left car event 211b has a gravity vector increasing from −9.8015 to −9.8007 then dropping to −9.8020, although an average gravity vector level (about −9.8018) during the off-boarding and on-boarding events 211b, 211c is similar to an average level (about −9.8018) before the door open event 211a, and an average level (about −9.8018) after the door close event 211d. In another embodiment, the system 100 can distinguish OCD events from OOB events in FIG. 2B based on that a door open event precedes an OOB event, and that the roll angle change direction of an off-boarding event is opposite to the direction of the door open event while the roll angle change direction of an on-boarding event in the same direction as the door open event.

In FIG. 2C, the gravity vector angles during the off-boarding and on-boarding events 211b, 211c drop to an average level (about −0.085) much lower than an average level (about −0.012) before the door open event 211a, and an average level (about −0.012) after the door close event 211d, which clearly distinguish the OOB events 211b, 211c from the OCD events 211a, 211d. In another embodiment, the system 100 can distinguish OCD events from OOB events in FIG. 2C based on that a door open event precedes an OOB event, and that the roll angle change direction of an off-boarding event is opposite to the direction of the door open event while the roll angle change direction of an on-boarding event in the same direction as the door open event.

To characterize the OOB events during the (3) stage, the system 100 can determine the side of an OOB event just from the side of a corresponding OCD event. Once the system 100 establishes the side of the OOB event, the system 100 can characterize the OOB event as off-boarding or on boarding based on that an off-boarding event will result in a signal in the opposite direction to the door opening event (as illustrated in FIG. 2B), while an on-boarding will result in signal in the same direction as the door opening event.

Gyroscope Based Detection, Classification and Characterization

In one embodiment, the system 100 can detect car turns and inclination changes, by integrating over differential rotations measured by a gyroscope. By analogy, the system 100 can also detect a change in the roll angle of the vehicle 101 by integrating over the differential rotations measured by the gyroscope as follows.

For instance, the system 100 can take a simpler approach as follows. During the interval time $t=t'-t'_0$, where $t'_0$ is an arbitrary start time after a door open event, the system 100 can compute a total rotation change in DFOR 203 as a product over the differential rotations as measured by the gyroscope according to the following equation (4):

$$R_{DFOR}(t) \Pi_j \dot{R}_j \cdot dt_j \quad (4)$$

Here $\dot{R}_j$ is a rotation matrix speed at time instance j, taken from the gyroscope measurements, and $dt_j$ is a time difference between two consecutive measurements $dt_j = t_j - t_{j-}$. For flat terrains, $R_{DFOR}$ is sufficient to determine the roll angle $\theta_{roll}$, since any rotation is assumed to have a roll angle effect. However, to account for any surface inclination effects, the system 100 can compute the rotation matrix from DFOR to VFOR using an equation (5) as follows, i.e., the rotation matrix R from DFOR 203 to VFOR 201. With the rotation matrix R, the system 100 no longer requires a predetermined device orientation, and just uses the rotation matrix R to convert gyroscope or other sensor data from the UE 105 to the VFOR 201, and then the vehicle roll angle(s) to determine OOB events and characteristic, such as on-board or off-boarding a left or right side door, etc.

$$Rvfor(t) = R(DFOR \rightarrow VFOR) \cdot R_{DFOR}(t) \cdot R(DFOR \rightarrow VFOR)^T \quad (5)$$

The rotation matrix can be converted to angle-axis formulation. The axis of rotation corresponds to the roll axis in vehicle coordinates when the vehicle 101 is on a horizontal surface, and the rotation angle can be obtained based on the following equation (6):

$$\cos \theta = \tfrac{1}{2}(Tr(R) - 1) \quad (6)$$

Where Tr(R) is the matrix trace, and R is either $R_{DFOR}$ OR $R_{VFOR}$.

The system 100 can assume that the UE 105 is in a stationary position during the OOB events sequence, such as for about 30 s during the initial and final 'car in motion' stages of the events sequence, in order to properly sample the transition from idle to in-motion states. Though stationary, the orientation of the UE 105 is arbitrary within the vehicle 101.

Figure 2D:
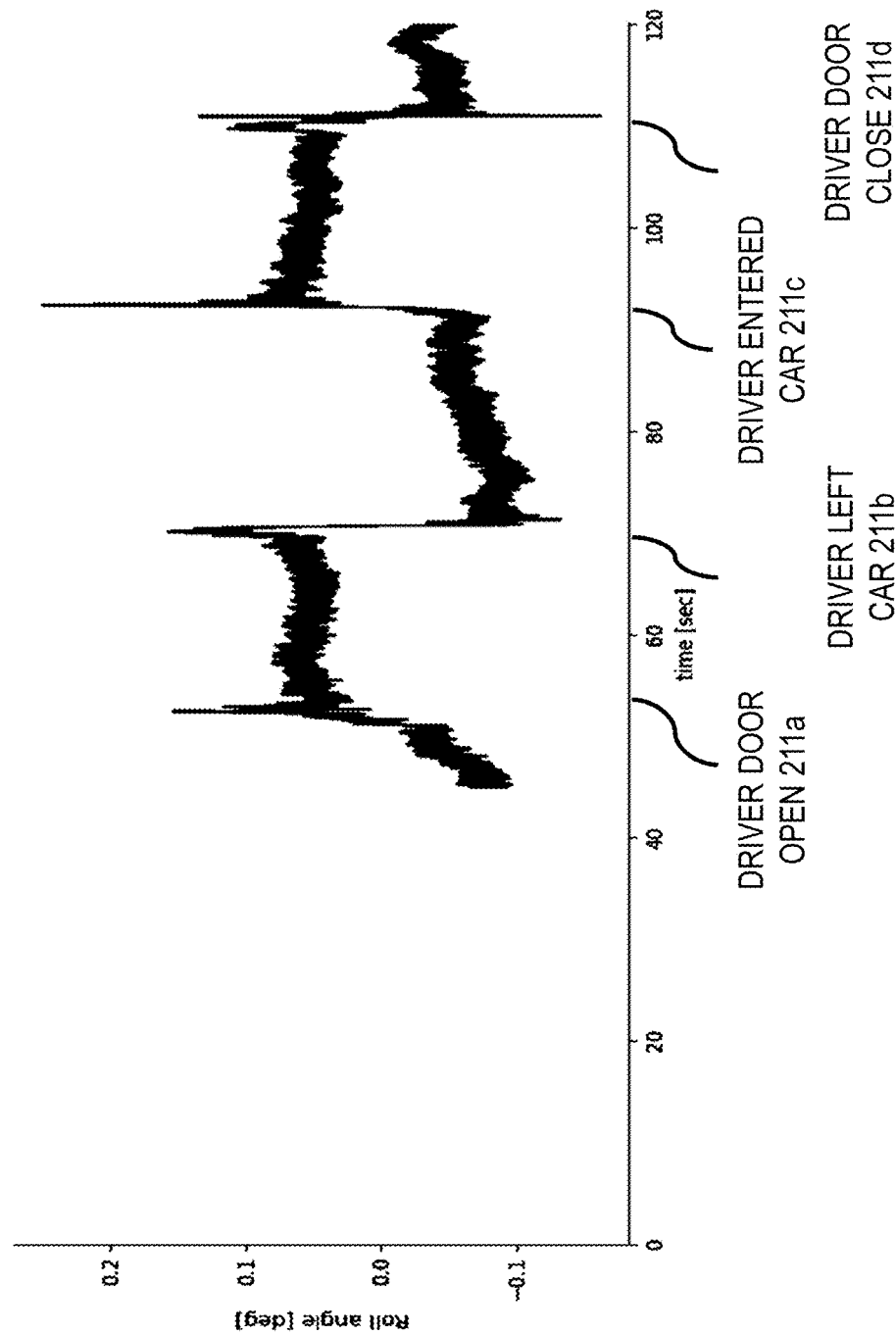
FIG. 2D illustrating an example roll angle profile of a vehicle, according to one embodiment.

To detect potential OOB signals based on semantic events during the (1) stage, the system 100 can observe clearly, of example, in FIG. 2D, the transitions associated with OCD events and OOB events. In this case, drift effects resulting from the integration over the noise component(s) of the measurement(s) are insignificant over short time intervals in which OOB events occur and can easily be accounted for (e.g., by linear detrending). A detrending can be applied to the roll angle data to remove a linear trend resulting from integrating over the random noise component(s) to show only the differences in roll angle values from the trend. The system 100 can detect the OCD and OOB events by tracing sharp roll angle level changes, typically occurring on the 1-2 s time scale. Furthermore, when a mean roll angle in FIG. 2D is different at the end of the ETW (compared to the beginning of the ETW), it is a clear indicator that there was an OOB event in-between. FIG. 2D illustrating an example roll angle profile 230 (in degree from −0.2 to 0.3) of a vehicle during a time window of 0-120 second, according to one embodiment. Integrated roll angle as measured around OOB events. FIG. 2D depicts roll angle is measured in DFOR axis-angle formulation, and a sequence of sematic events: a driver door opens at ~52 s, the driver left the car at ~70 s, the driver entered the car at ~90 s, and the driver door close at ~110 s.

To classify the OOB events during the (2) stage, the system 100 can distinguish OCD events from OOB events using FIG. 2D, although the OCD events and the OOB events are similar in shape and magnitude. In another embodiment, the system 100 can distinguish OCD events from OOB events based on that a door open event precedes an OOB event, and that the roll angle change direction of an off-boarding event is opposite to the direction of the door open event while the roll angle change direction of an on-boarding event in the same direction as the door open event.

To characterize the OOB events during the (3) stage, the system 100 can the system 100 can determine the side of an OOB event just from the side of a corresponding OCD event. Once the system 100 establishes the side of the OOB event, the system 100 can characterize the OOB event as off-boarding or on boarding based on that an off-boarding event will result in a signal in the opposite direction to the door opening event (as illustrated in FIG. 2D), while an on-boarding will result in signal in the same direction as the door opening event.

Camera Based Detection, Identification and Characterization

The above-described roll angle mechanism can also be captured by using the UE camera as a source of video stream. When the UE 105 is stationary and its camera is roughly forward-facing outwards during the OOB events, the system 100 can measure minute rotations of the images, to take advantage of image registration. The system 100 can assume that the UE 105 is placed on a stable mount in the vehicle 101 such that either the front or back cameras are able to capture one or more vehicle windows in the frame to view the outside. The UE 105 can be at any orientation. In one embodiment, the system 100 can measure that orientation and find the transformation from the DFOR to the VFOR as described. The UE 105 is assumed to be stationary during the ETW.

In one embodiment, the system 100 can calculate an image rotation angle around the image center between two frames using the 2D rotation matrix based on the following equation (7):

$$I_{rot} = R(I - T) = \begin{pmatrix} \cos(\theta) & -\sin(\theta) \\ \sin(\theta) & \cos(\theta) \end{pmatrix}(I - T) \quad (7)$$

Where $$I = \begin{pmatrix} x \\ y \end{pmatrix}$$

is the given pixel coordinates of an image $$I, T = \begin{pmatrix} x_c \\ y_c \end{pmatrix}$$

is the translation of the rotation center (image center in our case), θ is the rotation angle, R is the rotation matrix and $I_{rot}$ is the rotated image. Finding the rotation between two images $I_0$ and I can be expressed as a minimization problem over an objective function $O(\theta; I_0, I)$ as the following equation (8):

$$\theta_m = \text{argmin } O(\theta; I^0, I) \quad (8)$$

In one embodiment, the objective function can be expressed as the following equation (9):

$$O(\theta; I^0, I) = \sum_{pixels} [I_{rot}(\theta) - I^0]^2 \quad (9)$$

Many other forms of objective functions can be constructed. One problem with this approach is that rotations in general produce non-integer pixel coordinates. In this case, the problem gets worse since this image approach usually capture rotation angles in the order of milli-degree, and quantization effects may lead to noise which is substantially larger than the expected image rotation angles. The system 100 can partially handle this problem by different heuristics/resampling techniques known in the art. For instance, the system 100 can assume the intensity level at each integer pixel position as the value of the nearest non-integer neighbor. As another instance, the system 100 can calculate the intensity level at each integer pixel position based on a weighted average of the n nearest non-integer values, and the weighting can be proportional to the distance or pixel overlap of the nearby projections. The latter method produces better results but increases the computation time of the algorithm. As yet another instance, the system 100 can transform the image to polar or log-polar coordinates, and represent pixel k in Image I as the following equation (10):

$$I_k = x_k + iy_k = e^{\rho_k + i\theta_k} \quad (10)$$

Where $i = \sqrt{-1}$. A fixed rotation angle θ can be expressed as the following equation (11), i.e., a translation in the angle axis. In order to detect small angle shifts that are well below the resolution of the images, the system 100 can employ standard Fourier upsampling methods up to a required resolution of (say) 0.1 milli-degree and compute the angle shift between two images by calculating the cross-correlation. The peak location in the log-polar cross-correlation representation contains the angle shift and scale factor between the images.

$$I_k^{rot} = e^{\rho k + i(\theta_k - \theta)} \quad (11)$$

Figure 3A:
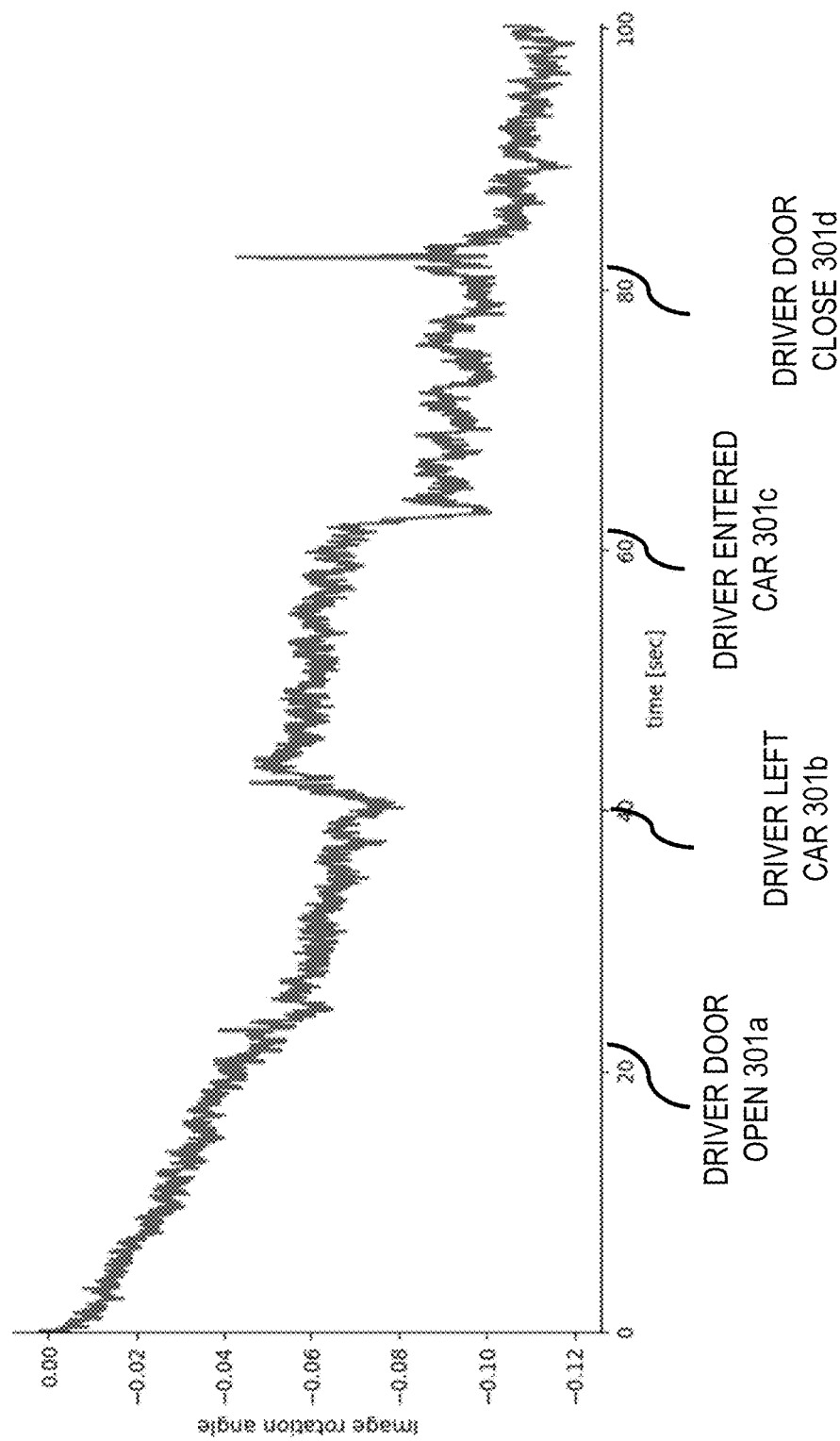
FIG. 3A illustrating an example image rotation angle profile of a vehicle, according to one embodiment.
Figure 3B:
FIG. 3B illustrating an example image of an image stream of a vehicle, according to one embodiment.
Figure 4:
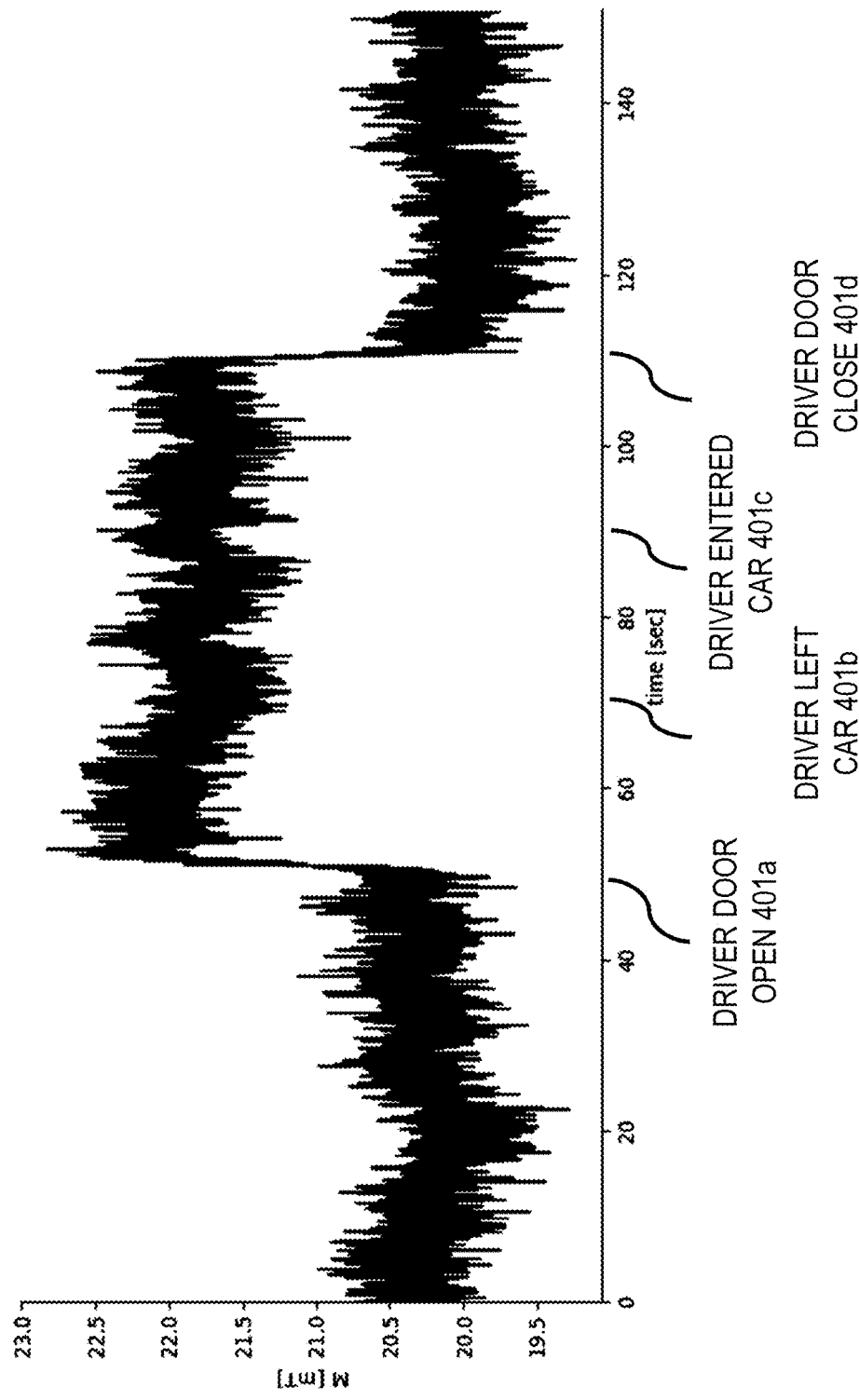
FIG. 4 illustrating an example magnetic field profile of a vehicle, according to one embodiment.

FIG. 3A illustrating an example image rotation angle profile 300 (in degree from 0.12-0) of a vehicle during a time window of 0-100 second, according to one embodiment. In particular, FIG. 3A shows a time sequence of the image rotation angle. For instance, the system 100 can calculate the image rotation angle relative to the 1st image. The drift in the image rotation angle in FIG. 3A is due to mechanical relaxation of the UE/mount pair over the 1st few minutes after mounting, which is flattening gradually. Thus, at least in the first few minutes, the system 100 can apply a detrending filter. The effect of OCD events is clearly shown in FIG. 3A, especially the door closing event which gives rise to a spike due to the mechanical impact between the door and the vehicle frame. OOB events are also clearly shown in FIG. 3A by exhibiting different polarity (signal change direction) during an off-boarding or on-boarding event. FIG. 3B illustrating an example image 310 of an image stream of a vehicle, according to one embodiment. the 1st image of the video stream discussed in FIG. 3A. For instance, the video was taken at HD resolution (1920px× 1080p) using the UE 105.

To detect potential OOB signals based on semantic events during the (1) stage, the system 100 can observe clearly in FIG. 3A the transitions associated with OCD events and OOB events. In the image approach, drift effects tend to appear in the 1st few minutes after mounting the UE 105, due to relaxation of some initial stresses in the system. These can easily be accounted for, e.g., by linear detrending as discussed above. Similarly, the system 100 can detect those events by tracing sharp image rotation angle level change, typically occurring on the 1-2 s time scale. Furthermore, when the mean image angle is different in the end of the ETW (compared to the beginning of the ETW), it is a clear indicator that there was an OOB event in-between.

To classify the OOB events during the (2) stage, the system 100 can distinguish OCD events from OOB events using FIG. 3A, although the OCD events and the OOB events are similar in shape and magnitude. In another embodiment, the system 100 can distinguish OCD events from OOB events based on that a door open event precedes an OOB event, and that the roll angle change direction of an off-boarding event is opposite to the direction of the door open event while the roll angle change direction of an on-boarding event in the same direction as the door open event.

To characterize the OOB events during the (3) stage, the system 100 can determine the side of an OOB event just from the side of a corresponding OCD event. Once the system 100 establishes the side of the OOB event, the system 100 can characterize the OOB event as off-boarding or on boarding based on that an off-boarding event will result in a signal in the opposite direction to the door opening event (as illustrated in FIG. 3A), while an on-boarding will result in signal in the same direction as the door opening event.

By way of example, the system 100 can calculate the time sequence of image angle (relative to the initial image), via a conversion to log-polar coordinates, up sampling (×1000) and cross correlation. The event sequence in FIG. 3A includes: driver door opens at ~22 s, driver left the car at ~40 s, driver entered the car at ~62 s, driver door close at ~85 s. The phone was placed on a dashboard mount, with back camera roughly facing the road (car x direction). The drift observed here is associated with the mechanical response of the mount. Although the UE 105 seemed to be tightly locked, there are small stress forces that lead to slow re-orientation in the minutes following the initial mounting.

Magnetometer Based Detection, Identification and Characterization

During the ETW, there can be at least two effects that affect the local magnetic field: (1) an OCD event accompanied by the movement of the door, which is a large metallic object in most cars, thus leading to significant and observable change in the local magnetic field as shown in FIG. 4, and (2) an OOB event leading to roll rotations as discussed thus to small changes in magnetic field direction in DFOR. Although the accuracy level of some magnetometers in the UE 105 may not be enough to detect the small roll angle changes in FIG. 4, as technology improves, these effects will stand out above the noise level. The system 100 can use improved magnetometer data for OOB detection as follows.

FIG. 4 illustrating an example magnetic field profile 400 (in mt from 19.0-23.0) of a vehicle during a time window of 0-150 seconds, according to one embodiment. Total magnetic field is measured around OOB events. The event sequence can include: driver door opens at ~52 s, driver left the car at ~70 s, driver entered the car at ~90 s, driver door close at ~110 s. Measurements were carried out using the UE 105 fixed in the vehicle 101. OCD events are clearly detected, whereas OOB events are currently below the noise level of the magnetometer.

To detect potential OOB signals based on semantic events during the (1) stage, the system 100 can clearly observe OCD events in FIG. 4, and project the magnetic field on the VFOR using the rotation matrix as described to extract the roll angle relative to an initial reference state at or prior to the ETW. There is an issue of the sensitivity of the method to the heading direction of the vehicle 101 (e.g., relative to the north). When the vehicle 101 is facing the north exactly, the body of the vehicle 101 coincides with the vehicle x-axis, any roll angle would result in no change in the total magnetic field. On the other hand, when the vehicle 101 is heading along the east-west axis, i.e. at 90° angle, the magnetic field approach will exhibit the maximum effect.

The system 100 can perform the same steps based on the magnetometer data as above-described for other sensor data to classify the OOB events during the (2) stage, and/or to characterize the OOB events during the (3) stage.

In other embodiments, the system 100 can selectively combine the above-discussed embodiments to provide definite OOB semantics. To detect OOB events based on tracing the time series signal coming from the various sensors, the system 100 can add some post-processing to extract the features associated with roll rotation via detecting sharp transition(s) of the signal(s) on a time scale of time of ~1-2 seconds. For instance, the system 100 can construct a simple threshold detector applied to periods right before and right after the OOB events (e.g., a good approximation stationary, with well-defined signal mean and spread. The OOB event leads to a change in the mean which is above a given threshold (e.g., beyond certain number of standard deviations).

As another instance, the system 100 can assume a sliding time window (e.g., with overlap(s)). For each window sample, the system 100 can estimate a statistical distribution of the signal and compare the statistical distribution to the already accumulated statistics, e.g., using Kolmagorov-Smirnof (KS) test, the Anderson-Darling test, etc. When a new sample is from the same distribution as an old sample, the system 100 can add the data to the accumulated history for better real-time distribution estimation. Following OOB events, when there is a change in the distribution, usually a shift, resulting in failure of the test (such as a low confidence value e.g., a low P-value), the system 100 can use the complementary 1−P-value as a confidence level for the OOB event detection.

In another embodiment, the system 100 can use/train an on-boarding/off-boarding event machine learning model (e.g., a deep neural network (DNN) classifier) to capture those transitions. In other embodiments, the system 100 can combine the abovementioned techniques and others.

With the detection results from the various described embodiments, the system 100 can construct an ensemble detector using methods via begging, boosting and stacking (e.g., to combine multiple models together can often produce a much more powerful model). Alternatively, the system 100 can use the various detectors outputs as features in a deep neural network algorithm (DNN), or in a recurrent neural network (RNN), which has the advantage of being state-aware and thus incorporate information about OCD events.

As mentioned, an OCD event has the same polarity (direction of change) as an on-boarding event, and opposite polarity to an off-boarding event. Thus, the system 100 can apply a classification algorithm as follows: (1) determining the side of the OCD event, (2) determining the polarity of the OCD event in the sensor signals and assign a detection confidence to each detector, such as the 1−Pvalue as discussed above, (3) classifying the OOB class for each detector (when the OOB event has the same polarity as a door open event then it is an on-boarding event; otherwise, it is off-boarding event), and (4) combining various detectors by ensemble methods such as begging (e.g., voting, weighted averaging, etc.) to make a final judgement regarding the type of OOB event.

For instance, the system 100 can determine OCD event characteristic, such as opening/closing a left or right side door, based on an angular momentum response of the gyroscope and a linear momentum response of the accelerometer to an OCD event. For instance, closing the door on the left side of the vehicle (i.e., the driver side in western Europe and the US) will result in an initial yaw rotation of the vehicle frame in the positive yaw rotation angle. Similarly, door closed on the right-hand side will result in an initial yaw rotation in the negative yaw rotation angle. Door opening results in similar effects, but of smaller magnitudes. When opening a door on the left side, due to angular momentum conservation, the vehicle frame is initially pushed in the direction of the positive yaw rotation angle, and vice versa on the right side. The effect of door open events (e.g., vibrations) on the vehicle frame, however, is much smaller compared to door close events, since door opening is a gentler operation involving smaller forces and angular momentum.

Regarding linear momentum response (accelerometer), closing the door generates a collision with the vehicle frame, such as forces that can be detected by the accelerometer. When closing the door on the left side, the system 100 can observe an initial spike in the negative y-axis which oscillates and then decays to zero. Similarly, when closing a door on the right side, 100 can observe an initial spike in the positive y-direction. Door opening results in similar oscillations, but of a smaller magnitude. When opening a door on the left side, due to linear momentum conservation, the vehicle frame is initially pushed in the direction of the negative y-axis, and vice versa on the right side. The effect, however, is much smaller compared to door close events, since door opening is a gentler operation involving smaller forces and linear momentum.

By way of example, when the UE 105 is placed in a holder in a predetermined orientation relative to the vehicle (e.g., the y-axis of the phone coincides with the z-axis of the vehicle), the corresponding angular component as measured on the UE 105 can be translated to the vehicle's yaw response and thus the system 100 can detect the side of the OCD event based on the polarity (sign) of the initial yaw angle.

Person Weight Estimation Based on Roll Angle Measurement

One outcome of the above-described embodiments is the ability to estimate the weight of the user involved in the OOB event. As explained above, the magnitude of the generated roll angle rotation in OOB events depends on the weight of the user involved and the mechanical characteristics of the car. However, the effect can be masked by noise originating from uncertainties, such as the vehicle model. Even within the same vehicle model class, there may be differences because of variations in construction and maintenance of the vehicles.

To learn the weight response of a specific vehicle (e.g., a given taxi), in one embodiment, the system 100 can construct a weight learning model (e.g., a minimal knowledge weight learning model) by collecting sensor information from multiple OOB events. When weight information of user population is known (or assumed), the system 100 can construct a mapping between the roll angle response and the population weight distribution, with the average roll angle being mapped to the average population weight. In addition, the system 100 can use the weight of specific individuals to calibrate the model.

For a given vehicle model, in another embodiment, the system 100 can do a "factory calibration" such that multiple OOB events are measured over one or many samples of the vehicle model (potentially both new and older ones), to generate an angle-weight calibration curve. Though limited by the set of cars used for calibration, such factory calibration model can give the right ballpark result.

Roll Angle and Weight Estimation on Inclined Roads

The above-discussed embodiments are not limited to flat terrain. When an OOB event takes place on inclined surfaces, the resulting torque is acting both around the x-axis and the y-axis of the vehicle 101, thereby yielding changes in roll and pitch angles simultaneously. When placed on an inclined road, the effective torque (in relation to the roll angle) can be expressed as the following equation (12):

$$\tau = r \times (mg \cdot \cos \alpha) \qquad (12)$$

Where $\alpha$ is the inclination angle of the road as shown in FIG. 2A. Since the roll angle is proportional to the applied torque $\tau$, the system 100 can take the inclination angle $\alpha$ into account. If the inclination angle $\alpha$ is known, the roll angle $\theta$ can be scaled to the corresponding horizontal road conditions based on the following equation (13):

$$\theta c = \theta / \cos \alpha \qquad (13)$$

Where $\theta c$ is the scaled roll angle, corresponding to horizontal road. The system 100 can take advantage of GPS based position and mapping services to align the vehicle 101 to the road and obtain the road inclination angle α from the mapping data, thus allowing passenger weight estimation at any road inclination.

In other embodiments, the system 100 can use other mobile device sensor data, such as audio signals collected by microphones (e.g., buckles on/off, door locking on/off, rider conversation, etc.), air pressure signals collected by barometers (e.g., measuring the air pressure in the vehicle 101 at the occurrence of OCD events), etc. to detect/verify, classify, and characterize OOB events.

Therefore, the system 100 can detect, classify, and characterize OOB event based on mobile device sensor data, without relying on vehicle sensor data that may be unavailable and need to be retrieved from vehicle manufacturers and/or third party service platforms.

Figure 5:
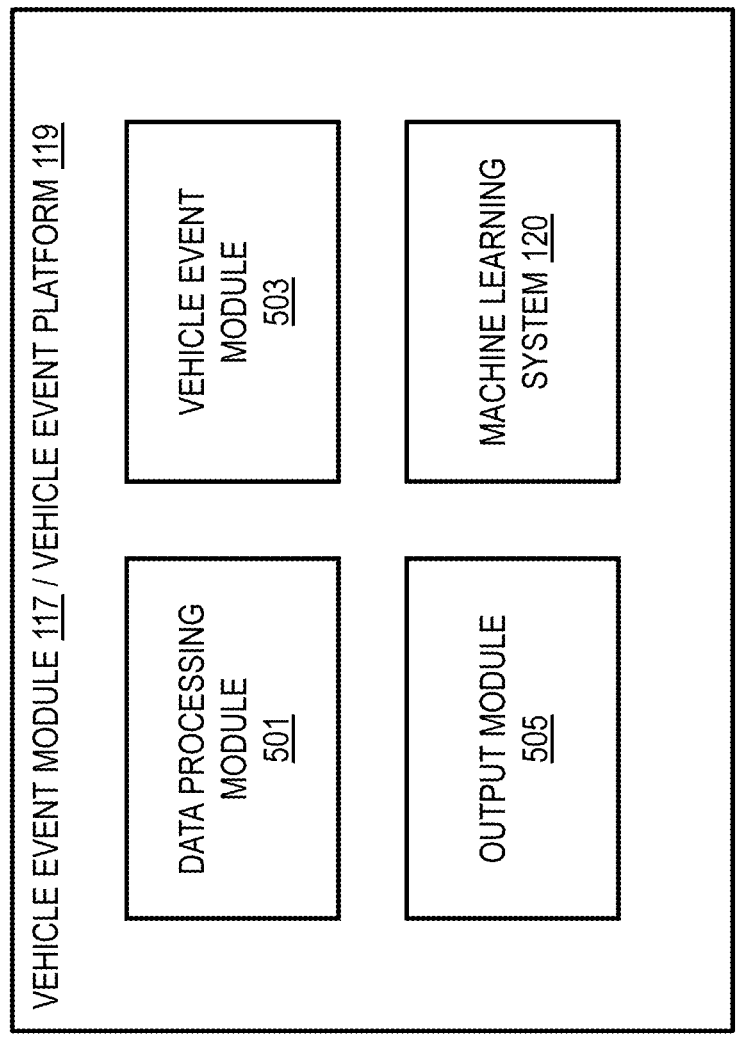
FIG. 5 is a diagram of a vehicle event module/vehicle event platform capable of detecting an on-boarding or off-boarding event based on mobile device sensor data, according to one embodiment.

FIG. 5 is a diagram of a vehicle event module/vehicle event platform capable of detecting an on-boarding or off-boarding event based on mobile device sensor data, according to one embodiment. In one embodiment, a vehicle event module 117 (e.g., a local component) and/or a vehicle event platform 119 (e.g., a network/cloud component) may perform one or more functions or processes associated with detecting an on-boarding or off-boarding event based on mobile device sensor data. By way of example, as shown in FIG. 5, the vehicle event module 117 and/or vehicle event platform 119 include one or more components for performing functions or processes of the various embodiments described herein. It is contemplated that the functions of these components may be combined or performed by other components of equivalent functionality. In one embodiment, the vehicle event module 117 and/or vehicle event platform 119 include a data processing module 501, a vehicle event module 503, an output module 505, and a machine learning system 120. The above presented modules and components of the vehicle event module 117 and/or vehicle event platform 119 can be implemented in hardware, firmware, software, or a combination thereof. In one embodiment, the vehicle event module 117, vehicle event platform 119, any of their modules 501-505, and/or the machine learning system 120 may be implemented as a cloud-based service, local service, native application, or combination thereof. The functions of vehicle event module 117, vehicle event platform 119, modules 501-505, and the machine learning system 120 are discussed with respect to FIGS. 2-7. For instance, the vehicle event module 503 can work in conjunction with the machine learning system 120 to detect on-boarding/off-boarding events, a door open/close, a vehicle idle state (e.g., in motion, idle with engine on, stopped with engine off), a turning event, a lane change, a direction of motion (e.g., forward or reverse drive), etc. using the following processes.

Figure 6:
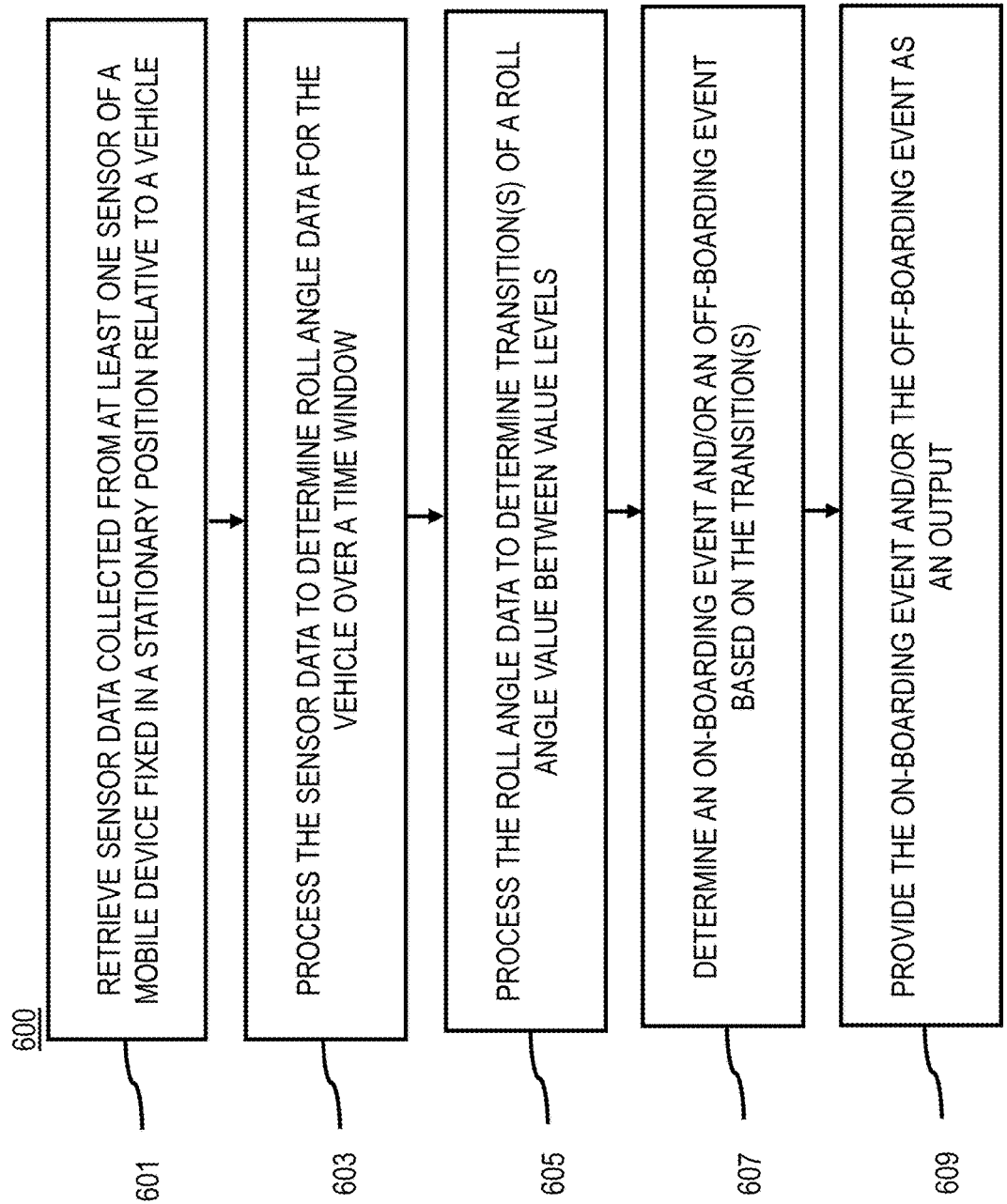
FIG. 6 is a flowchart of a process for detecting an on-boarding or off-boarding event based on mobile device sensor data, according to one embodiment.
Figure 10:
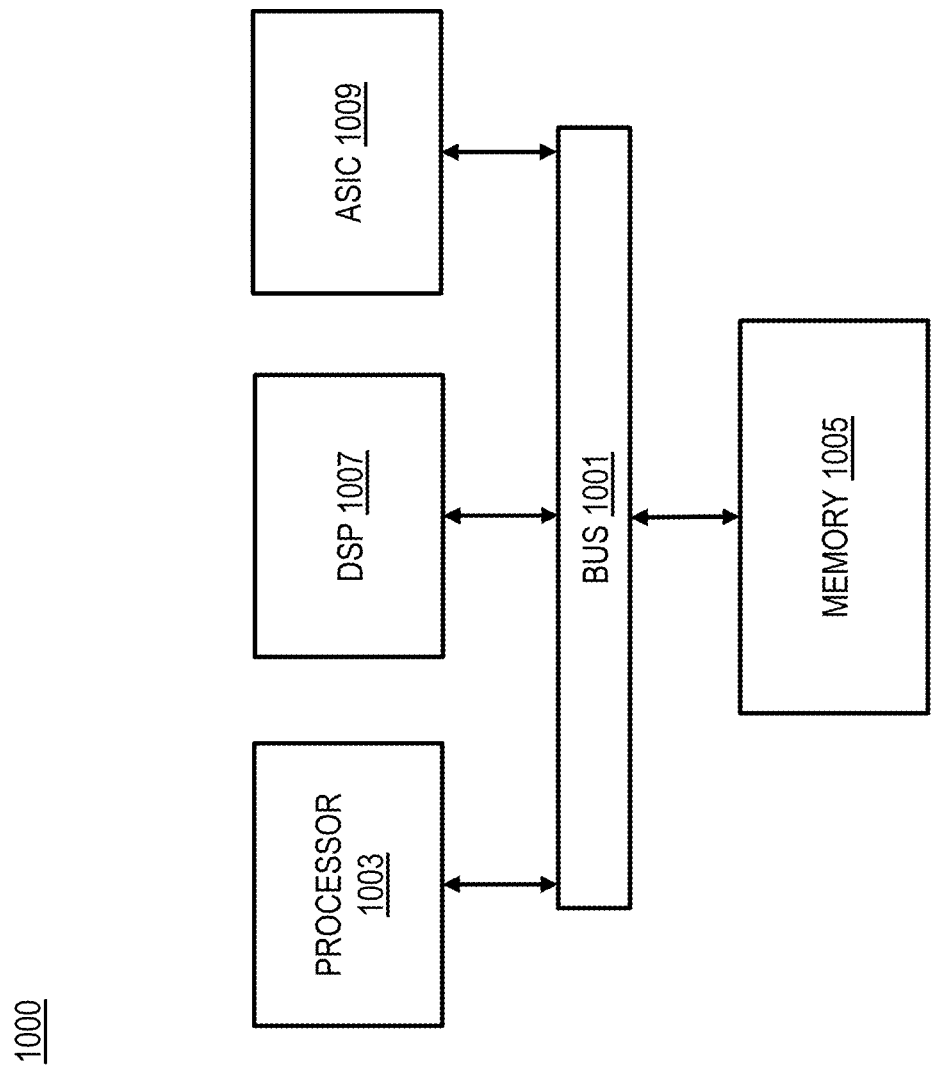
FIG. 10 is a diagram of a chip set that can be used to implement an embodiment.

FIG. 6 is a flowchart of a process for detecting an on-boarding or off-boarding event based on mobile device sensor data, according to one embodiment. In various embodiments, the vehicle event module 117, vehicle event platform 119, any of their modules 501-505, and/or the machine learning system 120 may perform one or more portions of the process 600 and may be implemented in, for instance, a chip set including a processor and a memory as shown in FIG. 10. As such, the vehicle event module 117, vehicle event platform 119, any of their modules 501-505, and the machine learning system 120 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all the illustrated steps.

In one embodiment, the system 100 can proceed with two layers: a data layer and an event layer. A first layer (the "data layer") can be generated by collecting data from sensors of the vehicles 101 and/or a user equipment (UE) device 105 (e.g., a driver's smart phone) in the vehicle 101, thereby processing the collected data for different types of sensors. A second layer (the "event layer") can include an algorithm that integrates data from one or more of the sensors in the first layer into a decision whether a certain event (e.g., an on-boarding or off-boarding event, a vehicle door opening or closing event, etc.) took place. As mentioned, the system 100 can use the sensor data 103 and the machine learning system 120 to build and/or train a machine learning model, i.e., the on-boarding or off-boarding event machine learning model (such as "rule based" or "probabilistic") to detect and/or infer the on-boarding or off-boarding event.

In the data layer, the sensor data 103 can be collected from one or more location sensors (e.g., a GPS receiver 107), one or more acceleration sensors (e.g., an accelerometer 109), one or more gyroscopes (e.g., a gyroscope 110), one or more atmospheric pressure meters (e.g., a barometer 111), one or more magnetic field meters (e.g., a magnetometer 113), one or more camera (e.g., a camera 114), microphones, etc.

In the event layer, in one embodiment, the system 100 can determine a vehicle door close/open event 106 of the vehicle 101 based on the sensor data 103, and then detect an on-boarding/off-boarding event 104 with respect to the vehicle door close/open event 106, to minimize false detection of on-boarding/off-boarding events.

In one embodiment, for example, in step 601, the data processing module 501 can retrieve sensor data collected from at least one sensor of a mobile device that is fixed in a stationary position relative to a vehicle.

In one embodiment, the at least one sensor includes an accelerometer, and the roll angle data is based on a polarity of response, a tilting of a gravity vector, or a combination thereof. In another embodiment, the at least one sensor includes a gyroscope, and the roll angle data is based on an angular change. In another embodiment, the at least one sensor includes a magnetometer, and the roll angle data is based on an angle change (e.g., of an effective north). In another embodiment, the at least one sensor includes a camera, and the roll angle data is based on an image tilting.

In one embodiment, in step 603, the vehicle event module 503 can process the sensor data to determine roll angle data for the vehicle over a time window.

In one embodiment, in step 605, the vehicle event module 503 can process the roll angle data to determine one or more transitions of a roll angle value of the vehicle between one or more value levels. For instance, the one or more transitions can be determined to occur over less than a threshold time duration.

In one embodiment, in step 607, the vehicle event module 503 can determine an on-boarding event, an off-boarding event, or a combination thereof based on the one or more transitions. For instance, the on-boarding event, the off-boarding event, or a combination thereof can be determined based on the roll angle data indicating that a first mean roll angle of the vehicle at a beginning of the time window differs from a second mean roll angle of the vehicle at an end of the time window by more than a threshold difference.

In one embodiment, the one or more transitions associated with the on-boarding event is in an opposite direction or polarity than the one or more transitions associated with the off-boarding event.

In one embodiment, the vehicle event module 503 can determine one or more characteristics of the on-boarding event, the off-boarding event, or a combination thereof based on the roll angle data. For instance, the one or more characteristics include at least one of: a side of the vehicle associated the on-boarding event, the off-boarding event, or a combination thereof; a front position or a back position of the vehicle associated the on-boarding event, the off-boarding event, or a combination thereof; a first weight of a person associated the on-boarding event, the off-boarding event, or a combination thereof; or a second weight of an object associated the on-boarding event, the off-boarding event, or a combination thereof.

In one embodiment, the vehicle event module 503 can extract one or more features of the roll angle data, the one or more transitions, the vehicle, or a combination thereof, and provide the one or more features as input to a machine learning value to determine the on-boarding event, the off-boarding event, or a combination thereof.

In one embodiment, in step 609, the output module 505 can provide the on-boarding event, the off-boarding event, or a combination thereof as an output.

In one embodiment, the system 100 can apply multiple independent sensors/algorithms for detecting an on-boarding/off-boarding event, for example, for redundancy in case when some sensors are missing or malfunctioning. For instance, the system 100 can apply one or more on-boarding/off-boarding detection algorithms on overlapping time windows (e.g., of 5-10 seconds).

In other embodiments, the system 100 can use or incorporate other sensors (gyroscopes, magnetometers, cameras, etc.), to detect OOB events. Given one or more types of the above-referenced sensor data, the system 100 can construct an algorithm to detect/identify OOB events. Such algorithm can be based on rules, thresholds, probabilities, classifications, etc. By way of example, an identification of OOB events can be done using a rule-based algorithm taking into account vehicle door open/close detection by sensor data profiles in FIG. 2B-FIG. 4.

As discussed, OOB events can be observed in the profiles of accelerometer, gyroscope, magnetometer, camera, etc. data. In another embodiment, the system 100 can further determine OOB event characteristic, such as on-boarding/off-boarding a left or right side door, based on an angular momentum response of the gyroscope and a linear momentum response of the accelerometer to an OCD event.

Regarding the angular momentum response (gyroscope), some of the angular momentum of the opening/closing door is transferred to the vehicle frame, forcing the angular momentum into vibrations that quickly decay. For instance, closing the door on the left side of the vehicle (i.e., the driver side in western Europe and the US) will result in an initial yaw rotation of the vehicle frame in the positive yaw rotation angle. Similarly, door closed on the right-hand side will result in an initial yaw rotation in the negative yaw rotation angle. Door opening results in similar effects, but of smaller magnitudes. When opening a door on the left side, due to angular momentum conservation, the vehicle frame is initially pushed in the direction of the positive yaw rotation angle, and vice versa on the right side. The effect of door open events (e.g., vibrations) on the vehicle frame, however, is much smaller compared to door close events, since door opening is a gentler operation involving smaller forces and angular momentum.

Regarding linear momentum response (accelerometer), closing the door generates a collision with the vehicle frame, such as forces that can be detected by the accelerometer. When closing the door on the left side, the system 100 can observe an initial spike in the negative y-axis which oscillates and then decays to zero. Similarly, when closing a door on the right side, 100 can observe an initial spike in the positive y-direction. Door opening results in similar oscillations, but of a smaller magnitude. When opening a door on the left side, due to linear momentum conservation, the vehicle frame is initially pushed in the direction of the negative y-axis, and vice versa on the right side. The effect, however, is much smaller compared to door close events, since door opening is a gentler operation involving smaller forces and linear momentum.

By way of example, when the UE 105 is placed in a holder in a predetermined orientation relative to the vehicle (e.g., the y-axis of the phone coincides with the z-axis of the vehicle), the corresponding angular component as measured on the UE 105 can be translated to the vehicle roll angle response and thus the system 100 can detect the side of the OOB event based on the polarity (sign) of the initial roll angle.

In general, the UE 105 can be located in an unknown arbitrary orientation relative to the vehicle. The system 100 can determine the rotation matrix R between the DFOR 203 and the VFOR 201. With the rotation matrix R, the system 100 no longer require a predetermined device orientation, and just uses the rotation matrix R to convert gyroscope data from the UE 105 to the VFOR 201, and then the vehicle roll angle change and dynamics become available to determine OOB event characteristic, such as on-boarding/off-boarding a left or right-side door.

In short, the system 100 can detect both on-boarding and off-boarding events. In addition, the system 100 can characterize the side of the OOB event and the passenger weights. The system 100 can provide the on-boarding and off-boarding information of the vehicle to various service providers, such as taxi services, ride hailing services, ride sharing services, fleet management services, etc., about the actual state of a vehicle and/or behaviors of a driver that is under their auspices. For instance, the system 100 can validate the beginning or end of a ride, to locate the accurate pick up and drop off of a passenger, and detect or prevent fraudulent behaviors by drivers that may consider to conceal actual data from the service providers. The information also assists in knowing the status of driver availability from the level of a single driver to an entire fleet, thereby optimizing ride bids, workload, shift planning, etc.

In one embodiment, the system 100 in connection with the machine learning system 120 can selects respective factors such as sensor data, map data, driving behaviors, vehicle state data, transport modes, ride hailing data, ride sharing data, traffic patterns, road topology, etc., to determine the on-boarding/off-boarding event machine learning model. In one embodiment, the machine learning system 120 can select or assign respective weights, correlations, relationships, etc. among the factors, to determine machine learning models for different vehicle(s)/fleets, etc. In one instance, the machine learning system 120 can continuously provide and/or update the machine learning models (e.g., a support vector machine (SVM), neural network, decision tree, etc.) during training using, for instance, supervised deep convolution networks or equivalents. In other words, the machine learning system 120 can train the machine learning models using the respective weights of the factors to most efficiently select optimal factors/weightings for different scenarios in different regions.

In another embodiment, the machine learning system 120 includes a neural network or other system to compare (e.g., iteratively) driver behavior patters, vehicle paths features, etc.) to detect OOBs, and/or driver cheating events. In one embodiment, the neural network of the machine learning system is a traditional convolutional neural network which consists of multiple layers of collections of one or more neurons (which are configured to process a portion of an input data). In one embodiment, the machine learning system 120 also has connectivity or access over the communication network 123 to the vehicle event database 121 and/or the geographic database 131.

In one embodiment, the machine learning system 120 can improve the process 400 using feedback loops based on, for example, user behavior and/or feedback data (e.g., from passengers). In one embodiment, the machine learning system 120 can improve the machine learning models using user behavior and/or feedback data as training data. For example, the machine learning system 120 can analyze correctly identified OOB/cheating event data, missed OOB/cheating event data, etc. to determine the performance of the machine learning models.

In one embodiment, the output module 505 can process the output to perform at least one of: (1) mapping a pickup or drop off area in a digital map, a database, or a combination thereof, (2) providing navigation routing data to the vehicle, the user, or a combination thereof, (3) fleet management, and (4) vehicle dispatch.

In one embodiment, the output module 505 can present/visualize vehicle door closing/opening events and/or on-boarding and off-boarding events of a vehicle on a user interface.

FIG. 7A is a diagram of a user interface associated with on-boarding/off-boarding events, according to one embodiment. In this example, the UI 701 shown may be generated for a UE 105 (e.g., a mobile device, an embedded navigation system of the vehicle 101, a server of a vehicle fleet operator, a server of a vehicle insurer, etc.) that depicts a bar chart 703 and a driver cheating scale 705. For instance, the bar chart 703 shows weekly mileages and detected OOB counts of the vehicle (e.g., a ride hailing vehicle), while the driver cheating scale 705 shows a probability that the driver of the ride hailing vehicle cheated.

The UI 701 further shows a display setting panel 707 that includes a setting dropdown menu 709, a plurality of vehicle state statistics switches 711, and an input 713 of "Analysis." By way of example, the state statistics switches 711 included Active 711*a*, To pick up 711*b*, Wait for order 711*c*, Inactive 711*d*, Accident 711*e*, OOB event 711*f*, etc.

By way of example, the OOB event 711*f* is switched on by a user (e.g., a driver, a passenger, a vehicle fleet management personnel, a vehicle insurance personnel, etc. with different levels of data access based on credentials), and the user further selects the input 713 of "Analysis". The user can be a human and/or artificial intelligence. Fleet management can go beyond vehicle dispatch to include purchasing and maintaining vehicles, registering and licensing vehicles, cutting costs and maximizing profits, etc. As a result, the system 100 can analyze the weekly mileages as being disproportion with the OOB counts of the ride hailing vehicle using the above-discussed embodiments, calculates the driver cheating score as 85, and displays the score in the driver cheating scale 705.

Figure 7B:
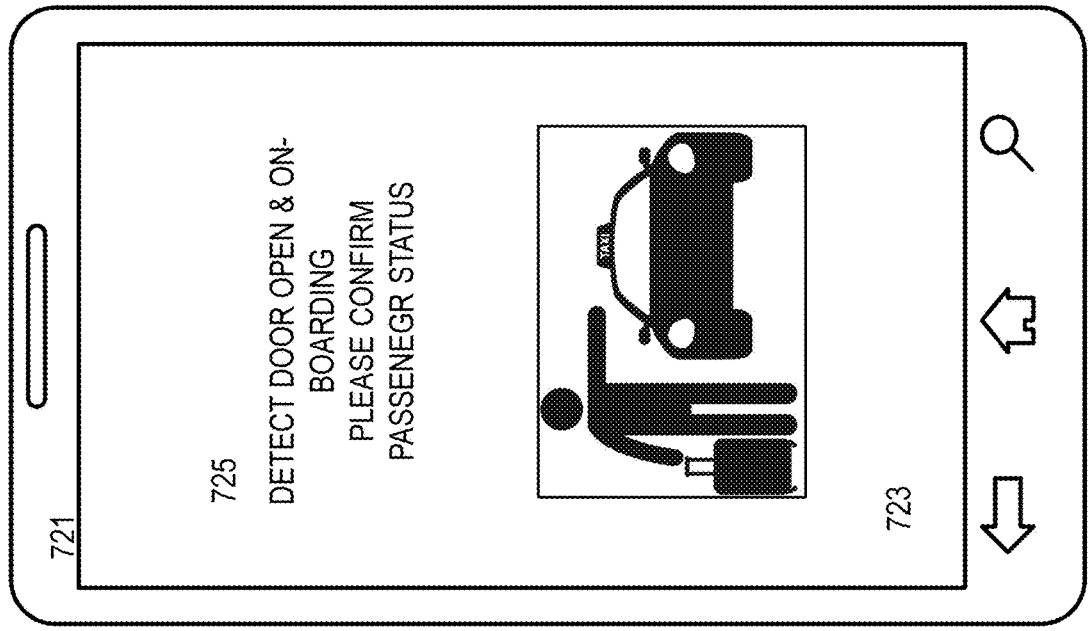
FIG. 7B is a diagram of an example user interface showing a passenger pick-up event, according to one embodiment.

Subsequently, the system 100 can monitor the driver's driving behaviors and/or OOB events based on the sensor data 103, and send alerts to the driver upon detecting a passenger on-boarding event and/or suspicious behaviors. FIG. 7B is a diagram of an example user interface showing a passenger on-boarding event, according to one embodiment. In this example, a UI 721 shown is generated for a UE 105 (e.g., a mobile device, an embedded navigation system, a client terminal, etc.) that includes a passenger on-boarding event diagram 723. By way of example, the system 100 monitors the vehicle state as to pick up, and detects a vehicle door open event and then an on-boarding event. The system 100 can then an alert 725: "Detect door open and on-boarding. Please confirm passenger status," as the reminder for the driver to enter the actual pick-up status.

In one embodiment, the system 100 can set different users with different access rights to different vehicle state statistics as well as different granular levels within each data feature. When the user selectively switches on the vehicle state statistics features, such the new driver 711*f*, the system 100 can factor in additional vehicle state statistics for the analysis.

In another embodiment, the system 100 may be configured to dynamically, in real-time, or substantially in real-time, adjust the alert based on driver behavior changes and display on the UI 701 accordingly. In yet another embodiment, the system 100 may be configured to dynamically, in real-time, or substantially in real-time, adjust the alert based on other contextual changes in weather, traffic, fuel costs, etc.

In other embodiments, the vehicle event data 121 can be provided by the output module 505 as an output over a communications network 123 to a service platform 125 including one or more services 127*a*-127*k* (also referred to as services 127). As discussed above, the services 127 can include, but are not limited to, mapping services, navigation services, ride-haling services, ride sharing services, parking services, vehicle insurance services, and/or the like that can combine the vehicle event data 121 with digital map data (e.g., a geographic database 131) to provide location-based services. It is also contemplated that the services 127 can include any service that uses the vehicle event data 121 to provide or perform any function. In one embodiment, the vehicle event data 121 can also be used by one or more content providers 129*a*-129*j* (also collectively referred to as content providers 129). These content providers 129 can aggregate and/or process the vehicle event data 121 to provide the processed data to its users such as the service platform 125 and/or services 127. The sensor data 103 and/or the vehicle event data 121 can be stored in a stand-alone database, or a geographic database 131 that also stores map data.

Returning to FIG. 1, the system 100 comprises one or more vehicles 101 associated with one or more UEs 105 having respective vehicle event modules 117 and/or connectivity to the vehicle event platform 119. The UE 105 can be mounted to the dashboard or other fixed position within the vehicle 101 or carried by a driver/passenger of the vehicle 101. The sensors can be standalone sensors within the UE 105 or part of an IMU 115 within the UE 105. It is noted, however, that embodiments in which the sensors are included within the UE 105 are provided by way of illustration and not as a limitation. In other embodiments, it is contemplated that the sensors (e.g., the magnetometer 113 and/or accelerometer 109) may be mounted externally to the UE 105 (e.g., as a component of the vehicle 101 or other devices within the vehicle 101). In addition, the vehicle event module 117 for calculating the distances or other parking characteristic/information of the vehicle 101 according to the embodiments described herein need not reside within the UE 105 and can also be included as a component of the vehicle 101 and/or any other device internal or external to the vehicle 101.

By way of example, the UEs 105 may be a personal navigation device ("PND"), a cellular telephone, a mobile phone, a personal digital assistant ("PDA"), a watch, a camera, a computer, an in-vehicle or embedded navigation system, and/or other device that is configured with multiple sensor types (e.g., accelerometers 109, gyroscope 110, magnetometers 113, camera 114, etc.) that can be used for determined vehicle speed according to the embodiments described herein. It is contemplated, that the UE 105 (e.g., cellular telephone or other wireless communication device) may be interfaced with an on-board navigation system of an autonomous vehicle or physically connected to the vehicle 101 for serving as a navigation system. Also, the UEs 105 and/or vehicles 101 may be configured to access the communications network 123 by way of any known or still developing communication protocols. Via this communications network 123, the UEs 105 and/or vehicles 101 may transmit sensor data collected from IMU or equivalent sensors for facilitating vehicle speed calculations.

The UEs 105 and/or vehicles 101 may be configured with multiple sensors of different types for acquiring and/or generating sensor data according to the embodiments described herein. For example, sensors may be used as GPS or other positioning receivers for interacting with one or more location satellites to determine and track the current speed, position and location of a vehicle travelling along a roadway. In addition, the sensors may gather IMU data, NFC data, Bluetooth data, acoustic data, barometric data, tilt data (e.g., a degree of incline or decline of the vehicle during travel), motion data, light data, sound data, image data, weather data, temporal data and other data associated with the vehicle and/or UEs 105 thereof. Still further, the sensors may detect local or transient network and/or wireless signals, such as those transmitted by nearby devices during navigation of a vehicle along a roadway. This may include, for example, network routers configured within a premise (e.g., home or business), another UE 105 or vehicle 101 or a communicable traffic system (e.g., traffic lights, traffic cameras, traffic signals, digital signage).

By way of example, the vehicle event module 117 and/or vehicle event platform 119 may be implemented as a cloud-based service, hosted solution or the like for performing the above described functions. Alternatively, the vehicle event module 117 and/or vehicle event platform 119 may be directly integrated for processing data generated and/or provided by the service platform 125, one or more services 127, and/or content providers 129. Per this integration, the vehicle event platform 119 may perform client-side state computation of vehicle speed data.

By way of example, the communications network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

A UE 105 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 105 can support any type of interface to the user (such as "wearable" circuitry, etc.).

By way of example, the UE 105s, the vehicle event module 117/vehicle event platform 119, the service platform 125, and the content providers 129 communicate with each other and other components of the communications network 123 using well known, new or still developing protocols. In this context, a protocol includes a set of rules defining how the network nodes within the communications network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
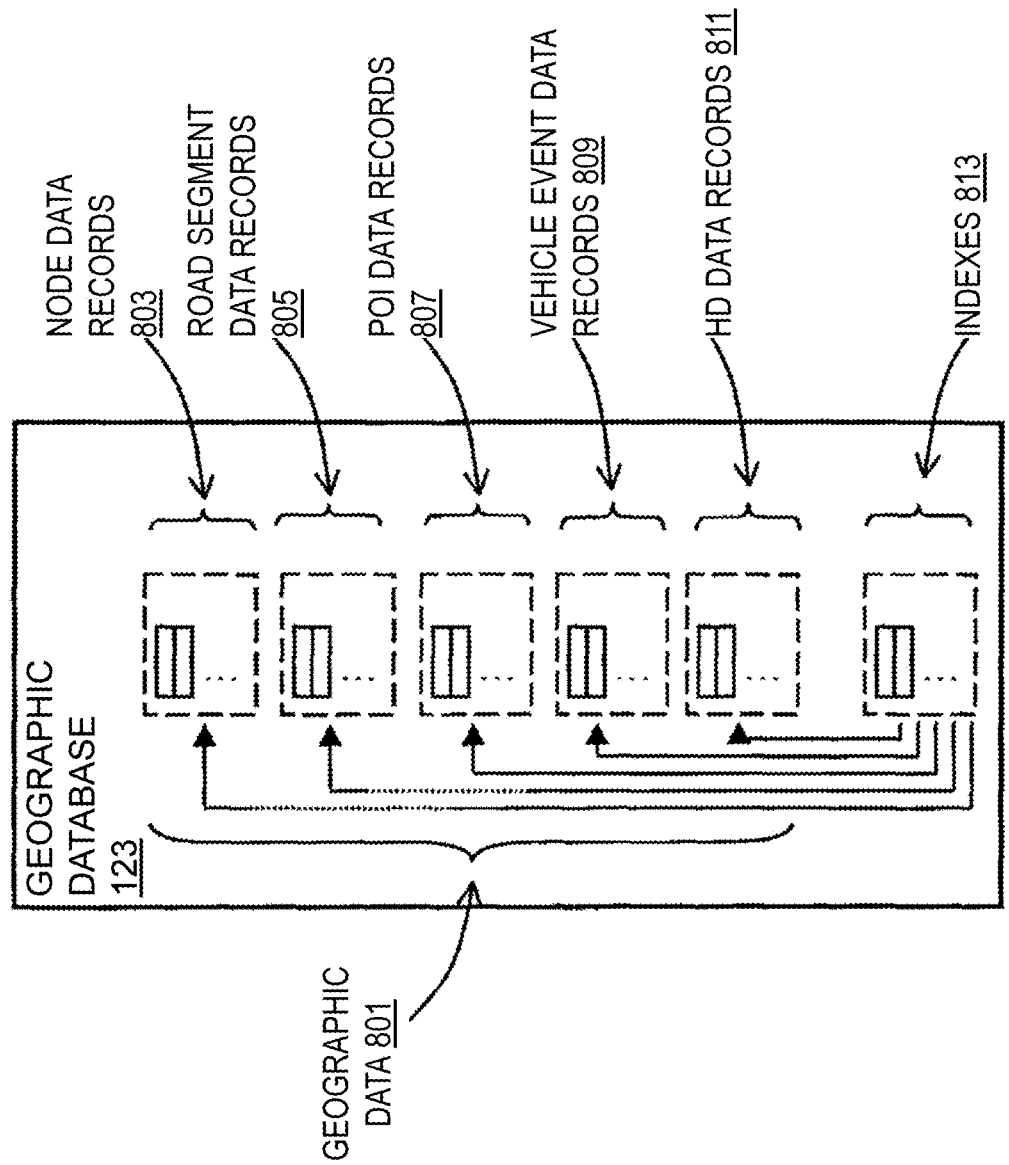
FIG. 8 is a diagram of a geographic database, according to one embodiment.

FIG. 8 is a diagram of a geographic database (such as the database 131), according to one embodiment. In one embodiment, the geographic database 131 includes geographic data 801 used for (or configured to be compiled to be used for) mapping and/or navigation-related services, such as for video odometry based on the parametric representation of lanes include, e.g., encoding and/or decoding parametric representations into lane lines. In one embodiment, the geographic database 131 include high resolution or high definition (HD) mapping data that provide centimeter-level or better accuracy of map features. For example, the geographic database 131 can be based on Light Detection and Ranging (LiDAR) or equivalent technology to collect very large numbers of 3D points depending on the context (e.g., a single street/scene, a country, etc.) and model road surfaces and other map features down to the number lanes and their widths. In one embodiment, the mapping data (e.g., mapping data records 811) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 131.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 131 follows certain conventions. For example, links do not cross themselves and do not cross each other except at a node. Also, there are no duplicated shape points, nodes, or links. Two links that connect each other have a common node. In the geographic database 131, overlapping geographic features are represented by overlapping polygons. When polygons overlap, the boundary of one polygon crosses the boundary of the other polygon. In the geographic database 131, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 131 includes node data records 803, road segment or link data records 805, POI data records 807, vehicle event data records 809, mapping data records 811, and indexes 813, for example. More, fewer or different data records can be provided. In one embodiment, additional data records (not shown) can include cartographic ("cartel") data records, routing data, and maneuver data. In one embodiment, the indexes 813 may improve the speed of data retrieval operations in the geographic database 131. In one embodiment, the indexes 813 may be used to quickly locate data without having to search every row in the geographic database 131 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points (such as intersections) corresponding to the respective links or segments of the road segment data records 805. The road link data records 805 and the node data records 803 represent a road network, such as used by vehicles, cars, and/or other entities. Alternatively, the geographic database 131 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 131 can include data about the POIs and their respective locations in the POI data records 807. The geographic database 131 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city). In one embodiment, certain attributes, such as lane marking data records, mapping data records and/or other attributes can be features or layers associated with the link-node structure of the database.

In one embodiment, the geographic database 131 can also include vehicle event records 809 for storing mobile device sensor data, mobile device sensor profile data, semantic event data, on-boarding/off-boarding event data, on-boarding/off-boarding event feature data, on-boarding/off-boarding event machine learning model data, training data, prediction models, annotated observations, computed featured distributions, sampling probabilities, and/or any other data generated or used by the system 100 according to the various embodiments described herein. By way of example, the vehicle event data records 809 can be associated with one or more of the node records 803, road segment records 805, and/or POI data records 807 to support localization or visual odometry based on the features stored therein and the corresponding estimated quality of the features. In this way, the vehicle event data records 809 can also be associated with or used to classify the characteristics or metadata of the corresponding records 803, 805, and/or 807.

In one embodiment, as discussed above, the mapping data records 811 model road surfaces and other map features to centimeter-level or better accuracy. The mapping data records 811 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the mapping data records 811 are divided into spatial partitions of varying sizes to provide mapping data to vehicles 101 and other end user devices with near real-time speed without overloading the available resources of the vehicles 101 and/or devices (e.g., computational, memory, bandwidth, etc. resources).

In one embodiment, the mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 811.

In one embodiment, the mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 131 can be maintained by the content provider 129 in association with the services platform 125 (e.g., a map developer). The map developer can collect geographic data to generate and enhance the geographic database 131. There can be different ways used by the map developer to collect data. These ways can include obtaining data from other sources, such as municipalities or respective geographic authorities. In addition, the map developer can employ field personnel to travel by vehicle (e.g., vehicles 101 and/or UEs 105) along roads throughout the geographic region to observe features and/or record information about them, for example. Also, remote sensing, such as aerial or satellite photography, can be used.

The geographic database 131 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a UE 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for detecting an on-boarding or off-boarding event based on mobile device sensor data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
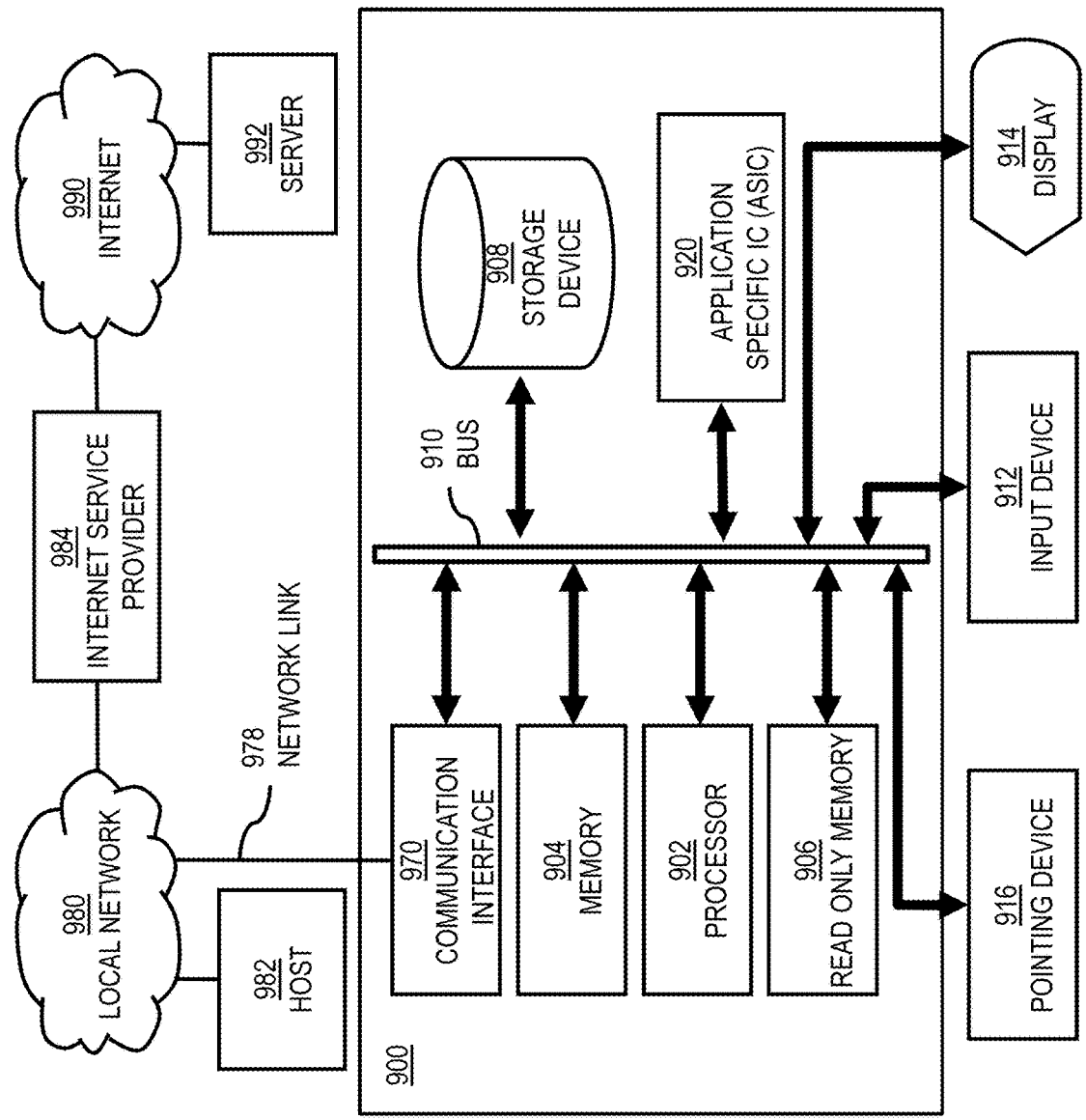
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to detect an on-boarding or off-boarding event based on mobile device sensor data as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to detecting an on-boarding or off-boarding event based on mobile device sensor data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RANI) or other dynamic storage device, stores information including processor instructions for detecting an on-boarding or off-boarding event based on mobile device sensor data. Dynamic memory allows information stored therein to be changed by the computer system 900. RANI allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, which is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, which persists even when the computer system 900 is turned off or otherwise loses power.

Information, including instructions for detecting an on-boarding or off-boarding event based on mobile device sensor data, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, which carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 123 for detecting an on-boarding or off-boarding event based on mobile device sensor data.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system can be deployed in various configurations within other computer systems, e.g., host 982 and server 992.

FIG. 10 illustrates a chip set 1000 upon which an embodiment of the invention may be implemented. Chip set 1000 is programmed to detect an on-boarding or off-boarding event based on mobile device sensor data as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to detect an on-boarding or off-boarding event based on mobile device sensor data. The memory 1005 also stores the data associated with or generated by the execution of the inventive steps.

Figure 11:
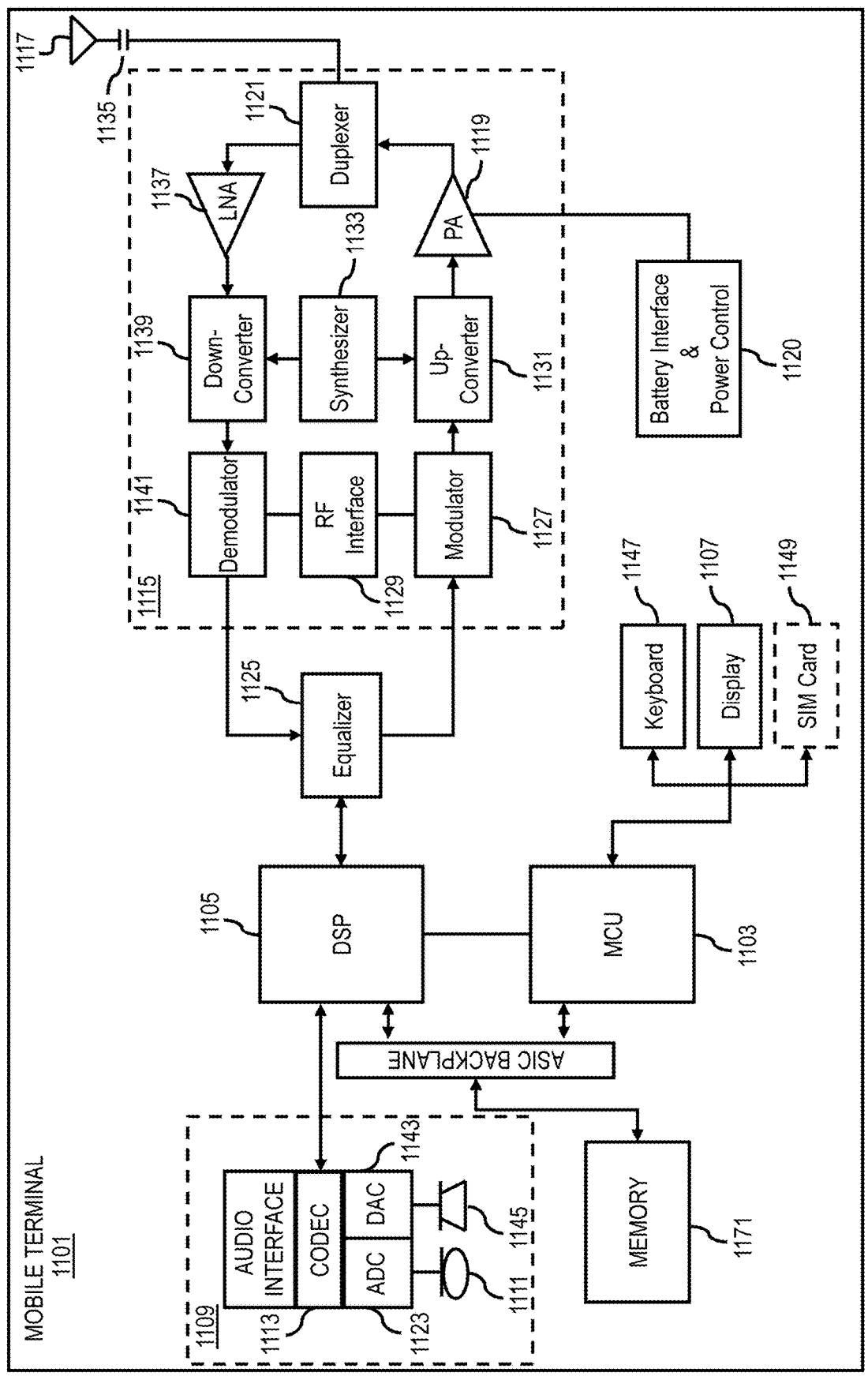
FIG. 11 is a diagram of a mobile terminal that can be used to implement an embodiment.

FIG. 11 is a diagram of exemplary components of a mobile terminal 1101 (e.g., handset or vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to detect an on-boarding or off-boarding event based on mobile device sensor data. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   retrieving, by one or more processors, sensor data collected from at least one sensor of a mobile device that is fixed in a stationary position relative to a vehicle;
   processing, by the one or more processors, the sensor data to determine roll angle data for the vehicle over a time window;
   processing, by the one or more processors, the roll angle data to determine one or more transitions of a roll angle value of the vehicle between one or more value levels;
   determining, by the one or more processors, an on-boarding event, an off-boarding event, or a combination thereof associated with at least one ride of a passenger, an object, or a combination thereof based on the one or more transitions;
   detecting, by the one or more processors based on the on-boarding event, the off-boarding event, or the combination thereof, (1) one or more fraudulent behaviors of a driver of the vehicle that conceals the at least one ride from one or more service platforms, (2) an availability status of the driver during the at least one ride, or a combination thereof, and
   providing, by the one or more processors via a network, the on-boarding event, the off-boarding event, the one or more fraudulent behaviors of the driver, the availability status of the driver, or a combination thereof as an output to the one or more service platforms.

2. The method of claim 1, further comprising:
   determining one or more characteristics of the on-boarding event, the off-boarding event, or a combination thereof based on the roll angle data,
   wherein the one or more service platforms (1) manage billing of the driver based on the one or more fraudulent behaviors, (2) dispatch the driver based on the availability status, or a combination thereof.

3. The method of claim 2, wherein the one or more characteristics include at least one of:
   a side of the vehicle associated with the on-boarding event, the off-boarding event, or the combination thereof;
   a front position or a back position of the vehicle associated with the on-boarding event, the off-boarding event, or the combination thereof;
   a first weight of a person associated with the on-boarding event, the off-boarding event, or the combination thereof; or
   a second weight of an object associated with the on-boarding event, the off-boarding event, or the combination thereof, and
   wherein the one or more service platforms are associated with one or more taxi services, one or more ride hailing services, one or more ride sharing services, one or more fleet management services, or a combination thereof.

4. The method of claim 1, wherein the at least one sensor includes an accelerometer, and wherein the roll angle data is based on a polarity of response, a tilting of a gravity vector, or a combination thereof.

5. The method of claim 1, wherein the at least one sensor includes a gyroscope, and wherein the roll angle data is based on an angular change.

6. The method of claim 1, wherein the at least one sensor includes a magnetometer, and wherein the roll angle data is based on an angle change.

7. The method of claim 1, wherein the at least one sensor includes a camera, and wherein the roll angle data is based on an image tilting.

8. The method of claim 1, further comprising:
validating a beginning, an end, or a combination thereof of the at least one ride based on the on-boarding event, the off-boarding event, or the combination thereof; and
locating a pick-up location, a drop-off location, or a combination thereof of the at least one ride based on the beginning, the end, or the combination thereof,
wherein (1) the availability status of the driver, (2) the one or more fraudulent behaviors of the driver, or the combination thereof are detected based on the pick-up location, the drop-off location, or the combination thereof, and
wherein the one or more transitions are determined to occur over less than a threshold time duration.

9. The method of claim 1, wherein the on-boarding event, the off-boarding event, or the combination thereof is determined based on the roll angle data indicating that a first mean roll angle of the vehicle at a beginning of the time window differs from a second mean roll angle of the vehicle at an end of the time window by more than a threshold difference.

10. The method of claim 1, wherein the one or more transitions associated with the on-boarding event are in an opposite direction or polarity than the one or more transitions associated with the off-boarding event.

11. The method of claim 1, further comprising:
extracting one or more features of the roll angle data, the one or more transitions, the vehicle, or a combination thereof; and
providing the one or more features as input to a machine learning model to determine the on-boarding event, the off-boarding event, or the combination thereof.

12. An apparatus comprising:
at least one processor; and
at least one memory including computer program code for one or more programs, the at least one memory and the computer program code configured to, with the at least one processor, cause the apparatus to:
retrieve sensor data collected from at least one sensor of a mobile device that is fixed in a stationary position relative to a vehicle;
process the sensor data to determine roll angle data for the vehicle over a time window;
process the roll angle data to determine one or more transitions of a roll angle value of the vehicle between one or more value levels;
determine an on-boarding event, an off-boarding event, or a combination thereof associated with at least one ride of a passenger, an object, or a combination thereof based on the one or more transitions;
detect, based on the on-boarding event, the off-boarding event, or the combination thereof, (1) one or more fraudulent behaviors of a driver of the vehicle that conceals the at least one ride from one or more service platforms, (2) an availability status of the driver during the at least one ride, or a combination thereof, and
provide, via a network, the on-boarding event, the off-boarding event, the one or more fraudulent behaviors of the driver, the availability status of the driver, or a combination thereof as an output to the one or more service platforms.

13. The apparatus of claim 12, wherein the apparatus is further caused to:
determine one or more characteristics of the on-boarding event, the off-boarding event, or the combination thereof based on the roll angle data,
wherein the one or more service platforms (1) manage billing of the driver based on the one or more fraudulent behaviors, (2) dispatch the driver based on the availability status, or a combination thereof.

14. The apparatus of claim 13, wherein the one or more characteristics include at least one of:
a side of the vehicle associated with the on-boarding event, the off-boarding event, or the combination thereof;
a front position or a back position of the vehicle associated with the on-boarding event, the off-boarding event, or the combination thereof;
a first weight of a person associated with the on-boarding event, the off-boarding event, or the combination thereof; or
a second weight of an object associated with the on-boarding event, the off-boarding event, or the combination thereof, and
wherein the one or more service platforms are associated with one or more taxi services, one or more ride hailing services, one or more ride sharing services, one or more fleet management services, or a combination thereof.

15. The apparatus of claim 12, wherein the at least one sensor includes an accelerometer, and wherein the roll angle data is based on a polarity of response, a tilting of a gravity vector, or a combination thereof.

16. The apparatus of claim 12, wherein the at least one sensor includes a gyroscope, and wherein the roll angle data is based on an angular change.

17. The apparatus of claim 12, wherein the at least one sensor includes a camera, and wherein the roll angle data is based on an image tilting.

18. A non-transitory computer-readable storage medium carrying one or more sequences of one or more instructions which, when executed by one or more processors, cause an apparatus to perform:
retrieving sensor data collected from at least one sensor of a mobile device that is fixed in a stationary position relative to a vehicle;
processing the sensor data to determine roll angle data for the vehicle over a time window;
processing the roll angle data to determine one or more transitions of a roll angle value of the vehicle between one or more value levels;
determining an on-boarding event, an off-boarding event, or a combination thereof associated with at least one ride of a passenger, an object, or a combination thereof based on the one or more transitions;
detecting, based on the on-boarding event, the off-boarding event, or the combination thereof, (1) one or more fraudulent behaviors of a driver of the vehicle that conceals the at least one ride from one or more service platforms, (2) an availability status of the driver during the at least one ride, or a combination thereof, and
providing, via a network, the on-boarding event, the off-boarding event, the one or more fraudulent behaviors of the driver, the availability status of the driver, or a combination thereof as an output to the one or more service platforms.

19. The non-transitory computer-readable storage medium of claim 18, wherein the apparatus is caused to further perform:

determining one or more characteristics of the on-boarding event, the off-boarding event, or the combination thereof based on the roll angle data, wherein the one or more service platforms (1) manage billing of the driver based on the one or more fraudulent behaviors, (2) dispatch the driver based on the availability status, or a combination thereof.

20. The non-transitory computer-readable storage medium of claim 19, wherein the one or more characteristics include at least one of:

a side of the vehicle associated with the on-boarding event, the off-boarding event, or the combination thereof;

a front position or a back position of the vehicle associated with the on-boarding event, the off-boarding event, or the combination thereof;

a first weight of a person associated with the on-boarding event, the off-boarding event, or the combination thereof; or a second weight of an object associated with the on-boarding event, the off-boarding event, or the combination thereof, and wherein the one or more service platforms are associated with one or more taxi services, one or more ride hailing services, one or more ride sharing services, one or more fleet management services, or a combination thereof.

* * * * *